United States Patent [19]

Sawada

[11] Patent Number: 5,983,629
[45] Date of Patent: Nov. 16, 1999

[54] DEVICE FOR DETERMINING DETERIORATION OF A CATALYST FOR AN ENGINE

[75] Inventor: Hiroshi Sawada, Gotenba, Japan

[73] Assignee: Toyota Jidosha Kabushiki Kaisha, Aichi-Ken, Japan

[21] Appl. No.: 08/908,656

[22] Filed: Aug. 7, 1997

[30] Foreign Application Priority Data

Aug. 9, 1996 [JP] Japan .................................... 8-211598

[51] Int. Cl.⁶ .................................................... F01N 3/00
[52] U.S. Cl. .............................. 60/276; 60/286; 60/285; 60/277
[58] Field of Search ............................ 60/276, 285, 286, 60/301, 277; 701/109, 104

[56] References Cited

U.S. PATENT DOCUMENTS

| | | | |
|---|---|---|---|
| 5,279,116 | 1/1994 | Shimizu et al. | 60/277 |
| 5,301,501 | 4/1994 | Shimizu et al. | 60/274 |
| 5,363,646 | 11/1994 | Orzel et al. | 60/274 |
| 5,412,941 | 5/1995 | Suzuki et al. | |
| 5,640,847 | 6/1997 | Nakajima et al. | 60/276 |
| 5,758,491 | 6/1998 | Agustin et al. | 60/274 |

FOREIGN PATENT DOCUMENTS

| | | |
|---|---|---|
| 4331153 | 3/1994 | Germany . |
| 19536798 | 4/1996 | Germany . |
| 598948 | 4/1993 | Japan . |
| 5163989 | 6/1993 | Japan . |
| 5171923 | 7/1993 | Japan . |
| 5263686 | 10/1993 | Japan . |
| 8-121152 | 5/1996 | Japan . |

*Primary Examiner*—Thomas E. Denion
*Assistant Examiner*—Binh Tran
*Attorney, Agent, or Firm*—Kenyon & Kenyon

[57] ABSTRACT

A device for determining deterioration of a catalyst having an $O_2$ storage capability and disposed in an exhaust passage of an engine comprises: upstream and downstream air-fuel ratio sensors disposed in the exhaust passage upstream and downstream of the catalyst respectively for detecting air-fuel ratios of exhaust gas upstream and downstream of the catalyst. The air-fuel ratio of the exhaust gas flowing into the catalyst is controlled on the basis of the output of the upstream air-fuel ratio sensor to make the air-fuel ratio flowing into the catalyst a target air-fuel ratio. A ratio of the length of the response curve of the output of the downstream air-fuel ratio sensor to the length of the response curve of the output of the upstream air-fuel ratio sensor is calculated. A ratio of the frequency of the output of the downstream air-fuel ratio sensor to the frequency of the output of the upstream air-fuel ratio sensor is calculated. It is determined that the catalyst has deteriorated when the length ratio is greater than a first predetermined ratio, or when the length ratio is greater than a second predetermined ratio which is smaller than the first predetermined ratio and the frequency ratio is greater than a third predetermined ratio.

9 Claims, 25 Drawing Sheets

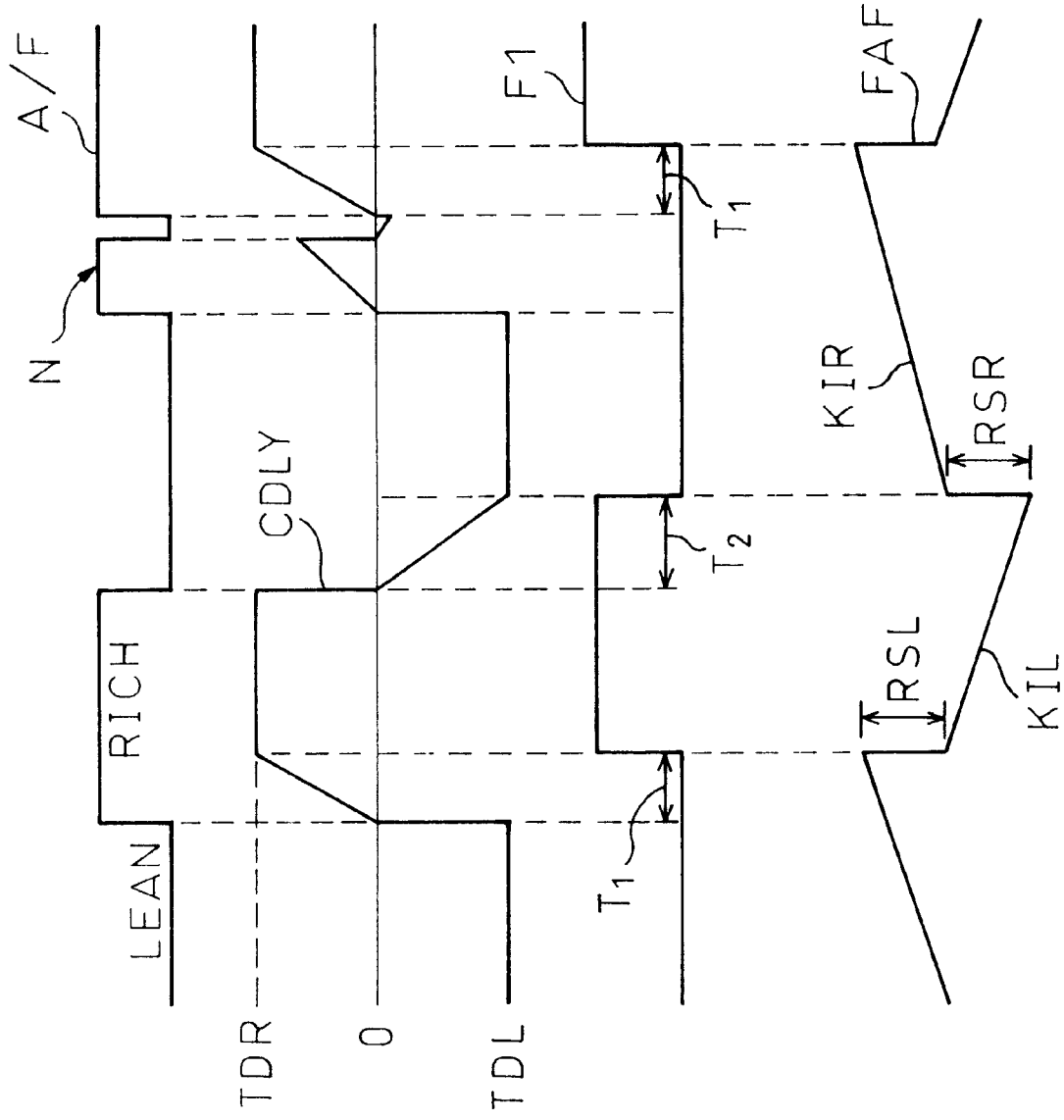

DEVICE FOR DETERMINING DETERIORATION OF A CATALYST FOR AN ENGINE

BACKGROUND OF THE INVENTION

1. Field of the Invention

The present invention relates to a device for determining deterioration of a catalyst for an engine. More specifically, the present invention relates to a device which feedback controls the air-fuel ratio of the engine in such a manner that the air-fuel ratio of the exhaust gas flowing into the catalyst changes between lean and rich, compared to the stoichiometric air-fuel ratio, alternately and detects deterioration of the catalyst on the basis of the outputs of air-fuel ratio sensors disposed in the exhaust passage upstream and downstream of the catalyst.

2. Description of the Related Art

A method for determining deterioration of a catalyst on the basis of the output signals of air-fuel ratio sensors disposed in an exhaust gas upstream and downstream of a catalyst of an engine is known. In this method, usually, deterioration of the catalyst is determined on the basis of at least the output signal of the downstream air-fuel ratio sensor when the air-fuel ratio of the exhaust gas flowing into the catalyst is feedback controlled to a stoichiometric mixture on the basis of at least the output signal of the upstream air-fuel ratio sensor.

A three-way catalyst usually has an $O_2$ storage capability, i.e., a capability for absorbing oxygen in the exhaust gas when the air-fuel ratio of the exhaust gas flowing into the catalyst is lean compared to the stoichiometric air-fuel ratio and for releasing the absorbed oxygen when the air-fuel ratio of the exhaust gas flowing into the catalyst is rich compared to the stoichiometric air-fuel ratio. Due to this $O_2$ storage capability, the air-fuel ratio of the exhaust gas flowing out from the catalyst is kept near the stoichiometric air-fuel ratio even when the air-fuel ratio of the exhaust gas flowing into the catalyst fluctuates between a rich air-fuel ratio and a lean air-fuel ratio in a relatively short cycle period. Therefore, if the catalyst does not deteriorate, the fluctuation of the air-fuel ratio of the exhaust gas upstream of the catalyst is smoothed by the catalyst and, thereby, the air-fuel ratio of the exhaust gas downstream of the catalyst fluctuates in a relatively small amplitude and at a relatively low frequency.

However, the $O_2$ storage capability of the catalyst decreases as the degree of deterioration of the catalyst becomes large, and the amount of oxygen absorbed and released by the catalyst becomes small when the catalyst deteriorates. Therefore, if the catalyst deteriorates, the air-fuel ratio of the exhaust gas downstream of the catalyst fluctuates in the manner similar to that of the air-fuel ratio of the exhaust gas upstream of the catalyst, i.e., when the catalyst deteriorates, the amplitude of the fluctuation of the air-fuel ratio of exhaust gas downstream of the catalyst becomes larger, and the frequency thereof becomes higher. The conventional method utilizes this phenomena for determining the deterioration of the catalyst. Namely, in the conventional method, it is determined that the catalyst deteriorates when the length per unit time of the response curve of the output of the downstream air-fuel ratio sensor becomes longer.

An example of the device which determines deterioration of the catalyst on the basis of the length per unit time of the response curve of the output of the downstream air-fuel ratio sensor is disclosed in Japanese Unexamined Patent Publication (Kokai) No. 5-98948.

The device in the '948 publication monitors the length per unit time of the response curve of the output of the downstream air-fuel ratio sensor when the air-fuel ratio of the engine is feedback controlled on the basis of the output of the upstream air-fuel ratio sensor in such a manner that the air-fuel ratio of the engine fluctuates regularly around the stoichiometric air-fuel ratio. If the length per unit time of the response curve of the output of the downstream air-fuel sensor becomes longer, the device determines that the catalyst is deteriorated.

If it is determined that the catalyst deteriorates on the basis of the length per unit time of the response curve of the output of the downstream air-fuel ratio sensor, a catalyst which is partially broken may be incorrectly determined as being deteriorated. In this case, the exhaust gas flows through the broken area of the catalyst so that the exhaust gas may not be purified. Therefore, the amplitude of the fluctuation of the output of the downstream air-fuel ratio sensor becomes larger. However, the amplitude of the fluctuation of the output of the downstream air-fuel ratio sensor is not increased to the degree that the catalyst is determined as being deteriorated if the degree of the breakage of the catalyst relative to the entire catalyst is small. Therefore, according to the above device for determining the deterioration of the catalyst on the basis of the length per unit time of the response curve of the output of the downstream air-fuel ratio sensor, a catalyst which is partially broken may not be determined as being deteriorated.

Further, if the downstream air-fuel ratio sensor deteriorates, the amplitude of the output of the downstream air-fuel ratio sensor becomes smaller. Therefore, although the catalyst deteriorates, the amplitude of the fluctuation of the output of the downstream air-fuel ratio sensor is not increased to the degree that the catalyst is determined as being deteriorated. Thus, according to the above device for determining the deterioration of the catalyst on the basis of the length per unit time of the response curve of the output of the downstream air-fuel ratio sensor, a catalyst which is partially broken may not be determined as being deteriorated.

SUMMARY OF THE INVENTION

Accordingly, the object of the invention is to provide a device for determining deterioration of a catalyst for an engine, which device can determine the deterioration of the catalyst in spite of the deterioration of the air-fuel ratio sensor and the manner of the deterioration of the catalyst.

According to the present invention, there is provided a device for determining deterioration of a catalyst having an $O_2$ storage capability and disposed in an exhaust passage of an engine comprising: an upstream air-fuel ratio sensor disposed in the exhaust passage upstream of the catalyst for detecting an air-fuel ratio of exhaust gas upstream of the catalyst; a downstream air-fuel ratio sensor disposed in the exhaust passage downstream of the catalyst for detecting the air-fuel ratio of the exhaust gas downstream of the catalyst; air-fuel ratio feedback control means for controlling the air-fuel ratio of the exhaust gas flowing into the catalyst on the basis of the output of, at least, the upstream air-fuel ratio sensor to make the air-fuel ratio of the exhaust gas flowing into the catalyst a target air-fuel ratio; length ratio calculating means for calculating a ratio of the length of the response curve of the output of the downstream air-fuel ratio sensor to the length of the response curve of the output of the upstream air-fuel ratio sensor; frequency ratio calculating means for calculating a ratio of the frequency of the output of the downstream air-fuel ratio sensor to the frequency of the output of the upstream air-fuel ratio sensor; and determining means for determining deterioration of the catalyst to determine that the catalyst has deteriorated when the length ratio is greater than a first predetermined ratio, or when the length ratio is greater than a second predetermined ratio which is smaller than the first predetermined ratio and the frequency ratio is greater than a third predetermined ratio.

Further, according to the present invention, the length of the response curve of the output of each air-fuel ratio sensor is calculated on the basis of difference between the levels of successive two output signals of each air-fuel ratio sensor.

Further, according to the present invention, the frequency ratio calculating means calculates the frequency ratio on the basis of a frequency at which the level of the output of each air-fuel ratio sensor reaches a reference level.

Further, according to the present invention, the frequency ratio calculating means calculates the frequency ratio on the basis of a frequency at which the difference between the level of the output in a decreasing state and the level of the output in an increasing state becomes greater than a predetermined level when the level of the output changes from the increasing state to the decreasing state, and vice versa.

Further, according to the present invention, the catalyst comprises a three way catalyst.

Further, according to the present invention, the air-fuel ratio sensor comprises an $O_2$ sensor for generating an output signal corresponding to the density of $O_2$ gas.

Further according to the present invention, the determining means operates when a condition of operation of the engine is in a predetermined condition.

Further, according to the present invention, the predetermined condition is determined by at least one of an engine speed, an amount of an intake air fed into the engine, an engine load, a temperature of the engine, and an opening degree of a throttle valve of the engine.

Further, according to the present invention, the air-fuel ratio feedback control means controls the air-fuel ratio of the exhaust gas in such a manner that the air-fuel ratio of the exhaust gas flowing into the catalyst changes between a rich air-fuel ratio and a lean air-fuel ratio, compared to a stoichiometric air-fuel ratio, alternately.

The present invention may be more fully understood from the description of the preferred embodiments of the invention set forth below, together with the accompanying drawings.

BRIEF DESCRIPTION OF THE DRAWINGS

The present invention will be better understood from the description as set forth hereinafter, with reference to the accompanying drawings in which:

FIGS. 7(a) through 7(d) are timing diagrams explaining the air-fuel ratio control in FIGS. 3 through 6;

DESCRIPTION OF THE PREFERRED EMBODIMENT

Figure 1:
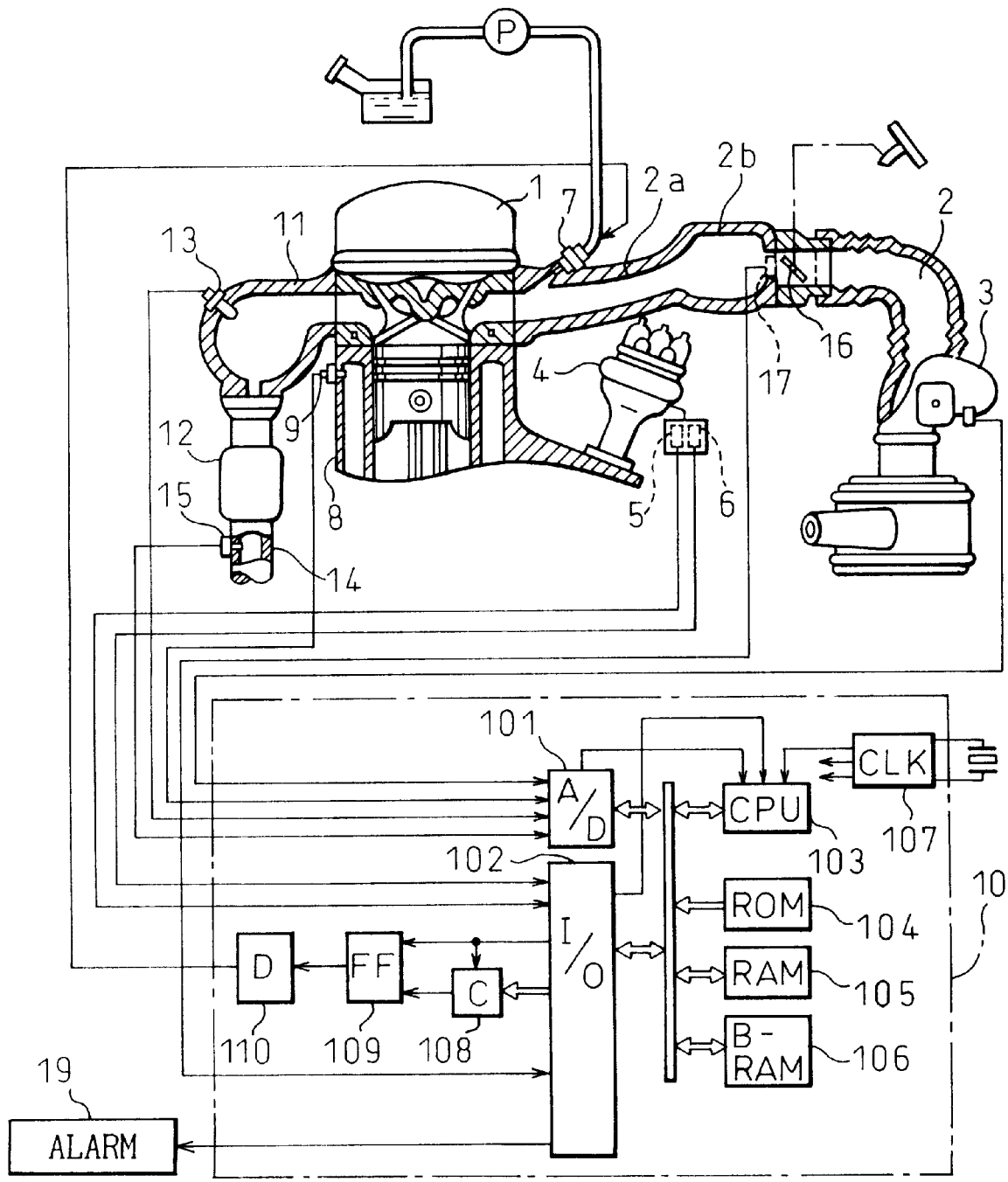
FIG. 1 schematically illustrates the first embodiment of the present invention when applied to an automobile engine.

FIG. 1 schematically illustrates an embodiment of the device for determining the degree of deterioration of the catalyst when the present invention is applied to an automobile engine.

In FIG. 1, reference numeral 1 represents an internal combustion engine for an automobile. 2a is an intake manifold which is connected to the intake port of the respective cylinders of the engine 1. 11 is an exhaust manifold which is connected to the exhaust port of the respective cylinders of the engine 1. The intake manifold 2a is connected to an intake air passage 2 via a surge tank 2b. The intake air passage 2 of the engine 1 is provided with a potentiometer-type airflow meter 3 for detecting the amount of air drawn into the engine 1. The airflow meter 3 is, for example, a movable vane type flow meter which generates an analog voltage signal proportional to the amount of air flowing into the engine 1. The signal from the airflow meter 3 is transmitted to a multiplexer-incorporating analog-to-digital (A/D) converter 101 of a control circuit 10.

Crank angle sensors 5 and 6, for detecting the angle of the crankshaft (not shown) of the engine 1, are disposed, for example, at a distributor 4 of the engine 1.

In this embodiment, the crank angle sensor 5 generates a pulse signal at every 720° crank angle and the crank angle sensor 6 generates a pulse signal at every 30° crank angle. The pulse signals from the crank angle sensors 5 and 6 are supplied to an input/output (I/O) interface 102 of the control circuit 10. Further, the pulse signal of the crank angle sensor 6 is then supplied to an interruption terminal of a central processing unit (CPU) 103.

In the intake passage 2, a fuel injection valve 7 is provided at an inlet port of each cylinder of the engine 1, for supplying pressurized fuel from the fuel system to the cylinders of the engine in response to the signal from the control circuit 10.

A coolant temperature sensor 9 for detecting the temperature of the coolant is disposed in a water jacket 8 of the cylinder block of the engine 1. The coolant temperature sensor 9 generates an analog voltage signal in response to the temperature THW of the coolant, and transmits this signal to the A/D converter 101 of the control circuit 10.

In the exhaust system, a three-way reducing and oxidizing catalyst 12 is disposed in the exhaust passage downstream of the exhaust manifold 11. The catalyst 12 has an $O_2$ storage capability and is capable of purifying three pollutants in the exhaust gas, i.e., CO, HC and $NO_x$, simultaneously.

Figure 25:
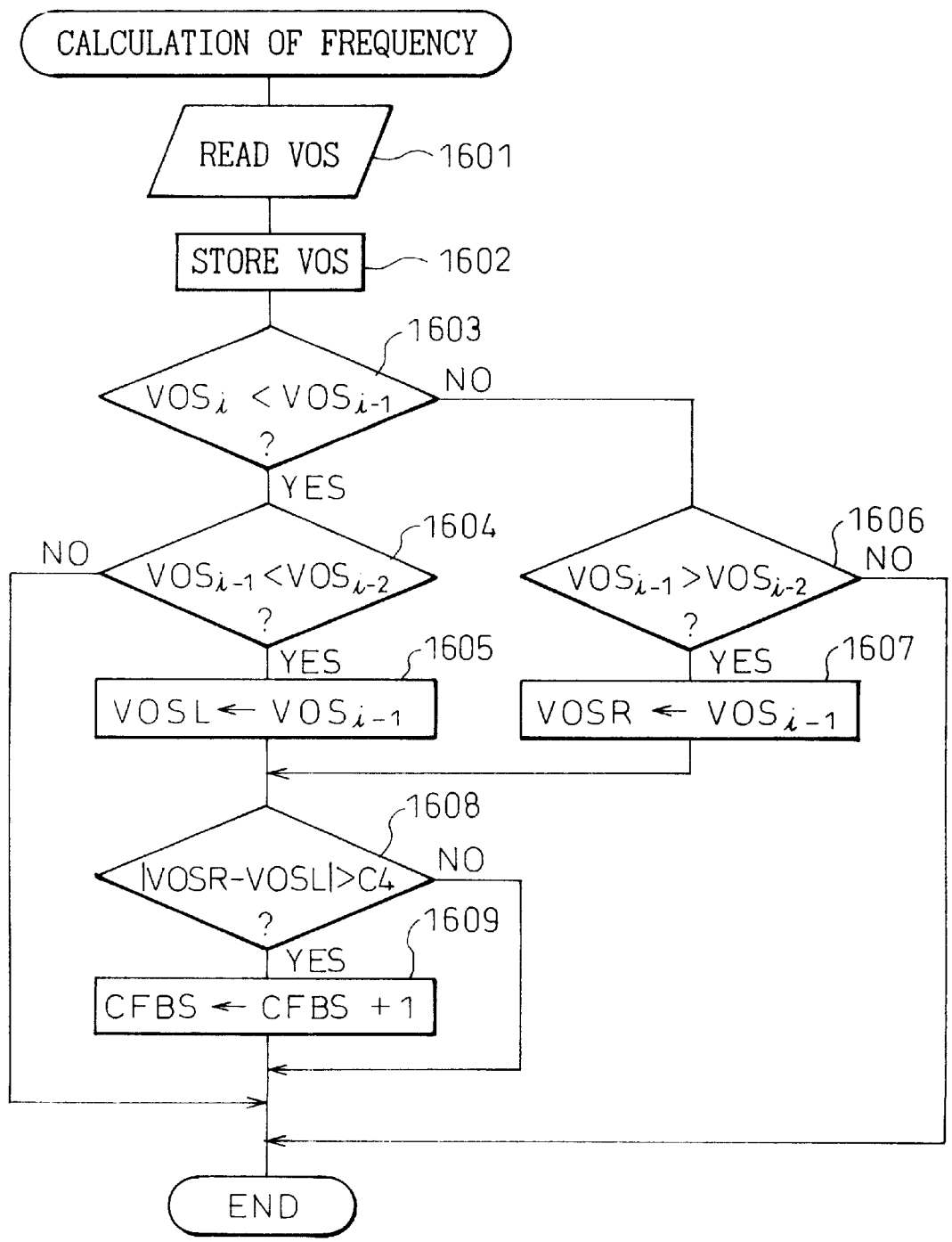
FIG. 25 is a flowchart illustrating a calculation of the frequency of the output of the $O_2$ sensors in the fourth embodiment according to the present invention.
Figure 26:
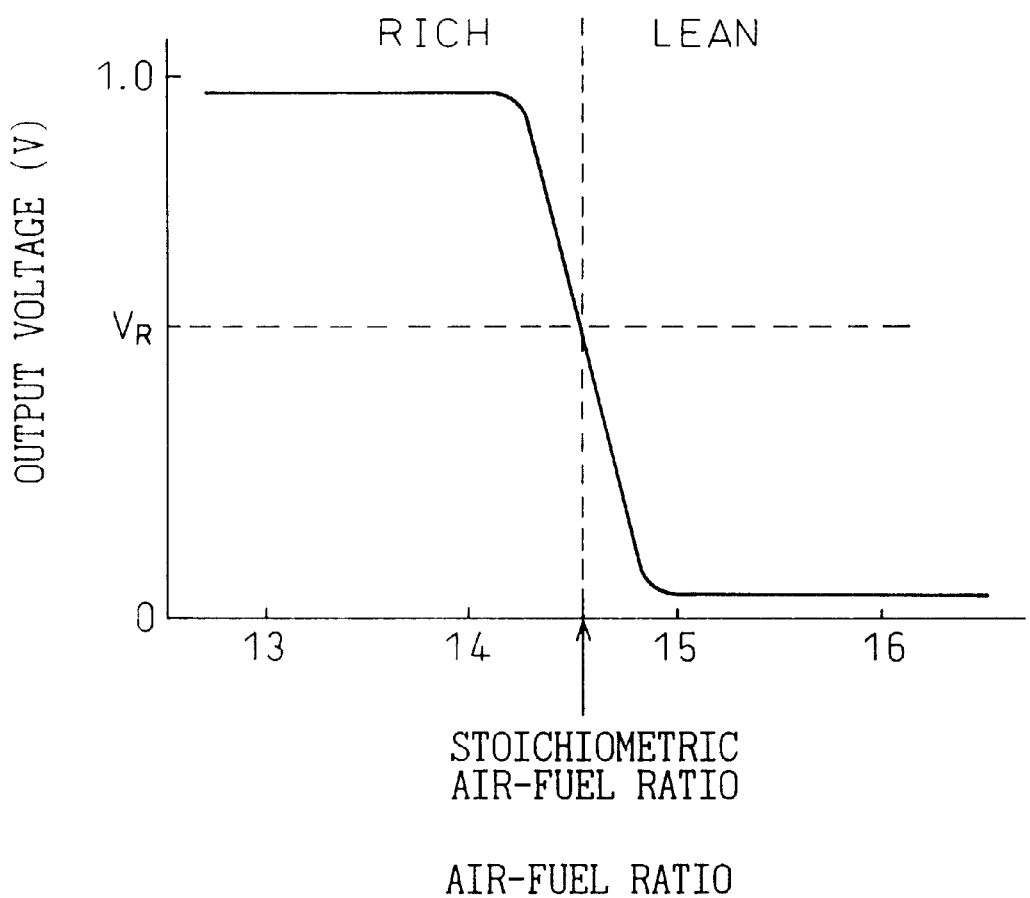
FIG. 26 is a diagram schematically illustrating the output characteristic of an $O_2$ sensor.

An upstream $O_2$ sensor 13 as an upstream air-fuel ratio sensor is provided at the exhaust manifold 11, i.e., upstream of the catalyst 12. A downstream $O_2$ sensor 15 as a downstream air-fuel ratio sensor is disposed at an exhaust pipe 14 downstream of the catalyst 12. The upstream $O_2$ sensor 13 and the downstream $O_2$ sensor 15 generate output signals corresponding to the concentration of the oxygen component in the exhaust gas. More specifically, the $O_2$ sensors 13 and 15 in this embodiment generate output voltage signals as shown in FIG. 25. As seen from FIG. 25, the $O_2$ sensors 13 and 15 output a 1.0 V voltage signal when the air-fuel ratio of the exhaust gas is rich compared to the stoichiometric air-fuel ratio, and output a 0 V voltage signal when the air-fuel ratio of the exhaust gas is lean compared to the stoichiometric air-fuel ratio. When the air-fuel ratio of the exhaust gas changes between rich and lean, the output voltage signals of the $O_2$ sensors 13 and 15 change suddenly near the stoichiometric air-fuel ratio and change from 1.0 V to 0 V or vice versa and pass the output voltage corresponding to the stoichiometric air-fuel ratio $V_R$ (the output voltage of the $O_2$ sensors corresponding to the stoichiometric air-fuel ratio is hereinafter referred to as "the reference voltage"). In this specification, the term "air-fuel ratio of the exhaust gas" means the ratio of the total amounts of air fed into the intake air passage, the combustion chamber, and the exhaust air passage upstream of a certain position in the exhaust passage to the total amount of fuel fed into the intake air passage, the combustion chamber, and exhaust passage upstream of the above-mentioned position. Therefore, if no air and fuel are supplied to the exhaust passage, the air-fuel ratio of the exhaust gas agrees with an operating air-fuel ratio of the engine (i.e., air-fuel ratio of the air-fuel mixture fed into the engine). The signals output by the $O_2$ sensors 13 and 15 are transmitted to the A/D converter 101 of the control circuit 10.

The control circuit 10, which may consist of a microcomputer, further comprises a central processing unit (CPU) 103, a read-only-memory (ROM) 104 for storing a main routine and interrupt routines such as a fuel injection routine and an ignition timing routine, and constants, etc., a random-access-memory (RAM) 105 for storing temporary data, a backup RAM 106, and a clock generator 107 for generating various clock signals. The backup RAM 106 is directly connected to a battery (not shown), and therefore, the contents of the backup RAM 106 are preserved even when the main switch of the engine is turned off.

A throttle valve 16, operated by the vehicle driver, is provided in the intake air passage 2, together with an idle switch 17 for detecting the opening of the throttle valve and generating a signal ("LL signal") when the throttle valve 16 is fully closed. This LL signal is supplied to the I/O interface 102 of the control circuit 10.

Reference 19 designates an alarm that is activated when it is determined that the catalyst 12 has deteriorated.

A down counter 108, a flip-flop 109, and a drive circuit 110 are provided in the control circuit 10 for controlling the fuel injection valve 7.

When a fuel injection amount TAU is calculated in a fuel injection amount calculation routine explained later, the amount TAU is preset in the down counter 108, and simultaneously, the flip-flop 109 is set, and as a result, the drive circuit 110 initiates the activation of the fuel injection valve 7. The down counter 108 counts up the clock signal from the clock generator 107, and finally, a logic 1 signal is generated from the terminal of the down counter 108, to reset the flip-flop 109, so that the drive circuit 110 stops the activation of the fuel injection valve 7, whereby an amount of fuel corresponding to the fuel injection amount TAU is supplied to the cylinders.

Interruptions occur at the CPU 103 when the A/D converter 101 completes an A/D conversion and generates an interrupt signal; when the crank angle sensor 6 generates a pulse signal; and when the clock generator 107 generates a special clock signal.

The intake air amount data Q from the airflow meter 3 and the coolant temperature data THW from the coolant sensor 9 are A/D-converted by a routine (s) carried out at predetermined time intervals, and then stored in the RAM 105; i.e., the data Q and THW in the RAM 105 are updated at predetermined time intervals. The engine speed Ne is calculated by an interruption routine executed at every 30° crank angle, i.e., at every pulse signal from the crank angle sensor 6, and is stored in the RAM 105.

In this embodiment, the air-fuel ratio of the engine 1 is the feedback controlled in the normal operation of the engine 1 on the basis of the output signals of the $O_2$ sensors 13 and 15 in such a manner that the air-fuel ratio of the engine changes alternately between rich and lean around the stoichiometric air-fuel ratio.

Figure 2:
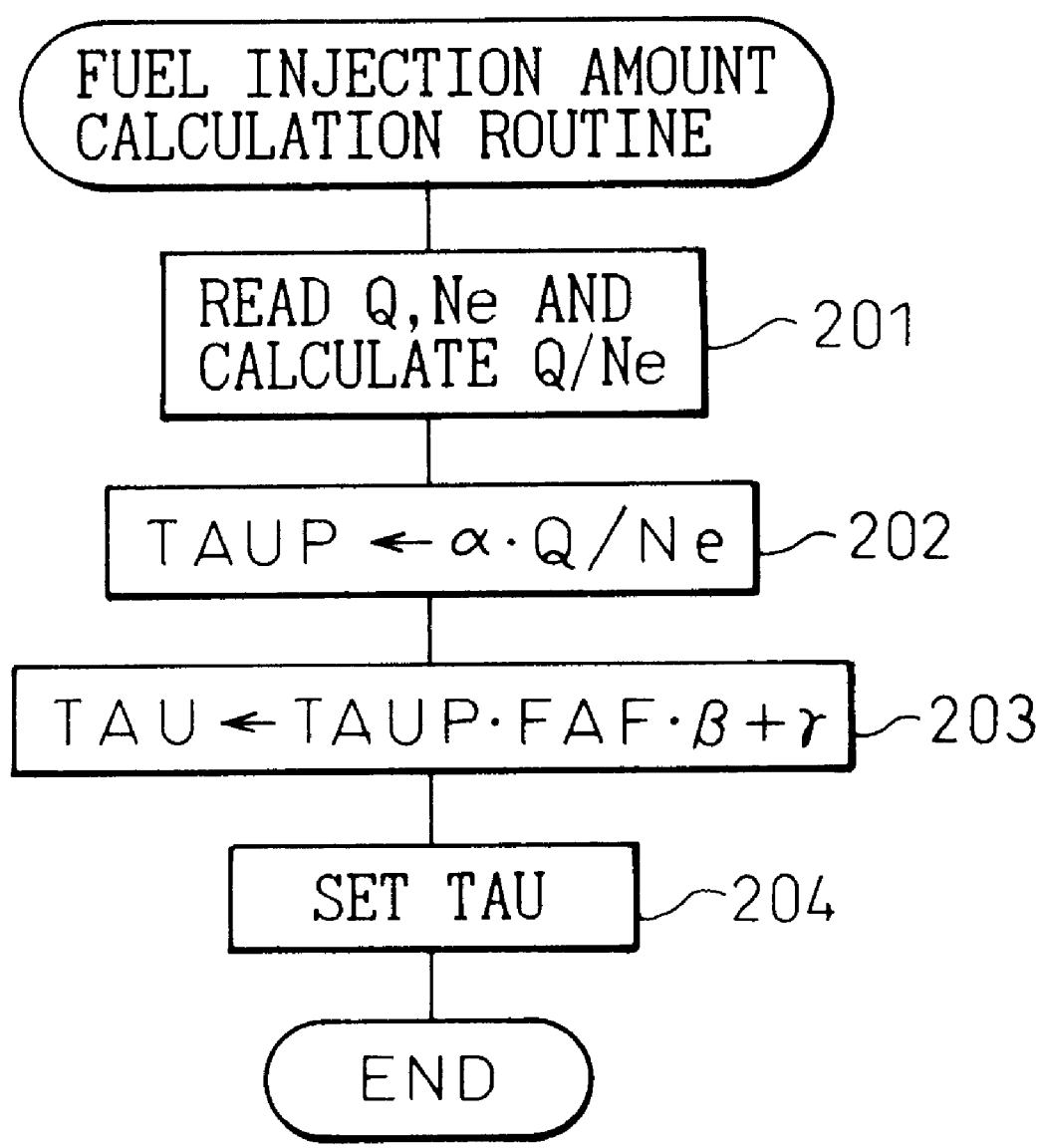
FIG. 2 is a flowchart illustrating a calculation of the amount of the fuel injection in the first embodiment according to the present invention.

FIG. 2 shows a flowchart of a fuel injection amount calculation routine in the first embodiment according to the present invention. The routine in FIG. 2 is carried out by the control circuit 10 at predetermined crank rotation angles (for example, every 360° rotation of the crankshaft). In the routine in FIG. 2, the fuel injection amount TAU, i.e., the length of the period in which the fuel injection valve 7 injects fuel, is calculated in accordance with the amount of intake air per one revolution of the engine Q/Ne and an air-fuel ratio correction factor FAF which is explained later. Namely, in the routine in FIG. 2, the intake air amount data Q and the engine speed data Ne are read from the predetermined storage area of the RAM 105, and the value Q/Ne is calculated (step 201). Then a basic fuel injection amount TAUP is calculated in accordance with the value Q/Ne by TAUP=α×Q/Ne (at step 202). The basic fuel injection amount TAUP is a fuel injection amount required to make the air-fuel ratio of the air-fuel mixture supplied to the combustion chamber of the engine 1 stoichiometric, and α is a constant.

The actual fuel injection amount TAU is calculated from the basic fuel injection TAUP and the air-fuel ratio correction factor FAF by the following formula (step 203).

$$TAU=TAUP \times FAF \times \beta + \gamma$$

In the above formula, β and γ are constants determined in accordance with the operating conditions of the engine. When the fuel injection amount TAU is calculated by the above explained steps, the value TAU is set at the down counter 108 at step 204 and, thereby, the amount of fuel corresponding to the value TAU is injected from the fuel injection valve 7.

Figure 3:
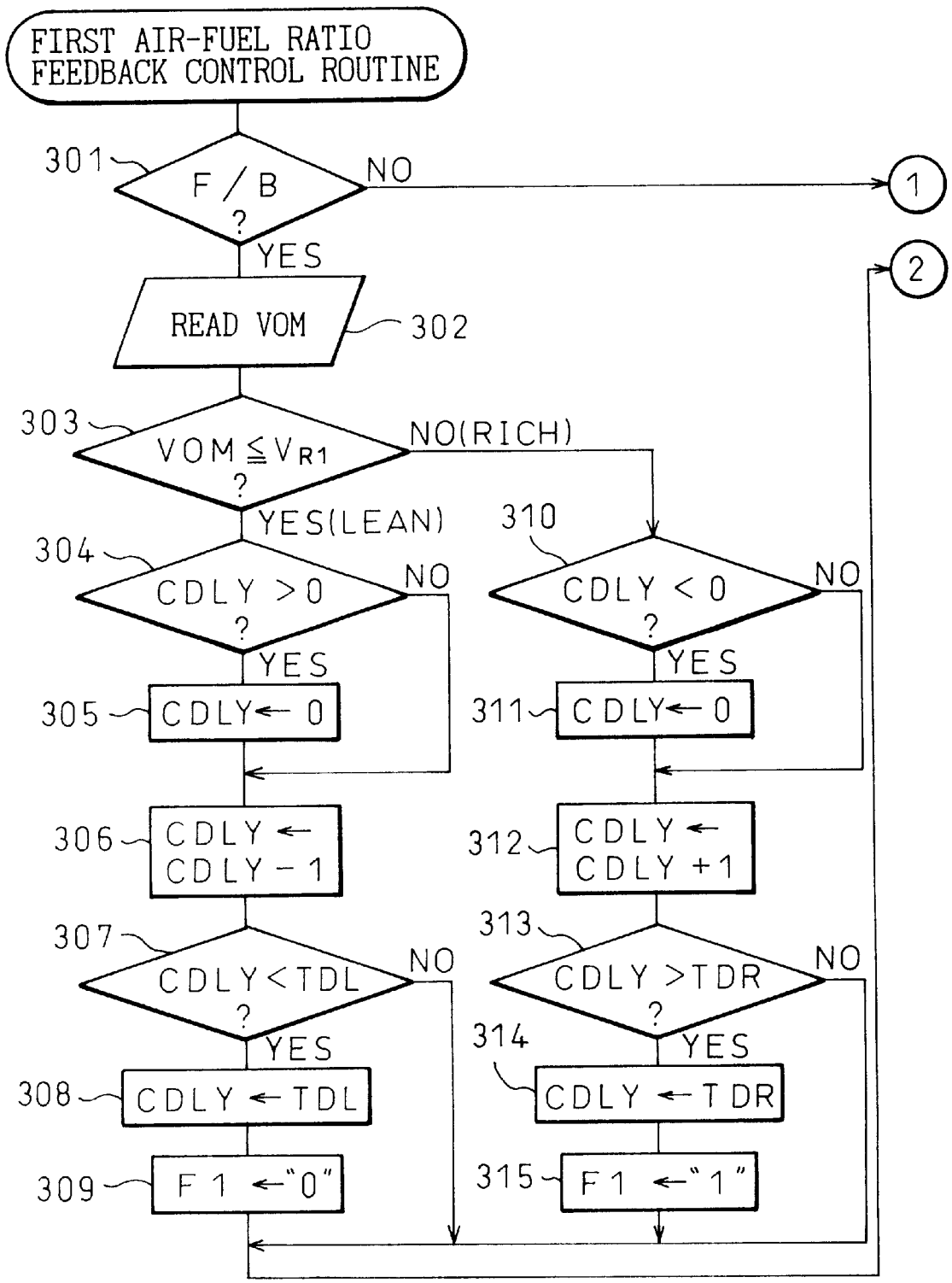
FIGS. 3 and 4 are a flowchart illustrating a first air-fuel ratio feedback control in the first embodiment according to the present invention.
Figure 4:
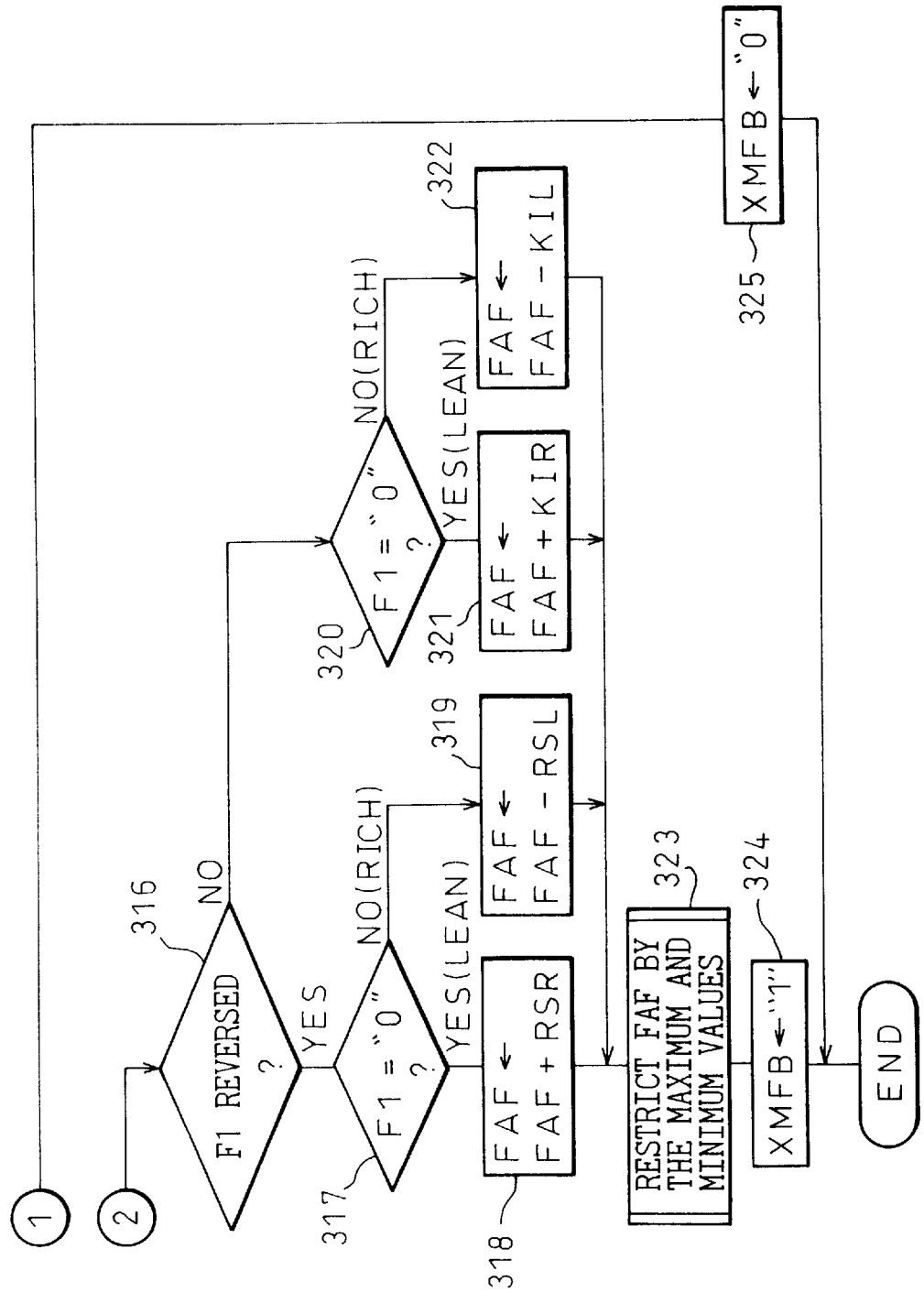

FIGS. 3 and 4 illustrate a first air-fuel ratio feedback control routine in which the value of the air-fuel ratio correction factor FAF in FIG. 2 is determined in accordance with the output signal of the upstream $O_2$ sensor 13. The routine in FIGS. 3 and 4 is carried out by the control circuit 10 at a predetermined time intervals (for example, every 4 ms).

In this routine, the value of the air-fuel ratio correction factor FAF is decreased when an output voltage signal VOM of the $O_2$ sensor 13 is higher than the reference voltage $V_{R1}$ (i.e., VOM>$V_{R1}$) of the $O_2$ sensor 13, and is increased when the output VOM is lower than or equal to the reference voltage $V_{R1}$ (i.e., VOM≦$V_{R1}$). As explained before, the reference voltage VR1 is an output voltage of the $O_2$ sensor 13 which corresponds to the stoichiometric air-fuel ratio. By adjusting the value of FAF in accordance with the air-fuel ratio of the exhaust gas, the air-fuel ratio of the engine is maintained near the stoichiometric air-fuel ratio even if the characteristics of the elements in the fuel supply system such as the airflow meter 3 and the fuel injection valve 7 deviate from the design characteristics by a certain amount.

The flowchart in FIGS. 3 and 4 is explained in brief. When the routine starts in FIG. 3, at step 301, it is determined whether the conditions for carrying out the air-fuel ratio feedback control are satisfied. The conditions determined at step 301 are, for example, whether the $O_2$ sensor 13 is activated, whether the engine 1 is warmed up and whether a predetermined time has elapsed since a fuel cut operation (in which the fuel injection is interrupted) such as in an engine brake operation is terminated. If these conditions are satisfied at step 301, the routine executes steps 302 and other steps, to calculate the value of FAF. If any of the conditions are not satisfied, the routine terminates after setting the value of a flag XMFB at 0 at step 325 in FIG. 4. XMFB is a flag which represents whether the first air-fuel ratio control is being carried out, and XMFB=0 means that the first air-fuel ratio control is interrupted.

Steps 302 through 315 in FIG. 3 are steps for determining the air-fuel ratio of the exhaust gas. F1 in steps 309 and 315 is a flag representing whether the air-fuel ratio of the exhaust gas is on a rich side (F1=1) or on a lean side (F1=0) compared to the stoichiometric air-fuel ratio. The value of F1 is switched (reversed) from 1 to 0 (a lean condition to a rich condition) when the $O_2$ sensor 13 continuously outputs a rich signal (i.e., VOM>$V_{R1}$) for more than a predetermined time period (TDR) (steps 303 and 310 through 315). Similarly, the value of F1 is switched (reversed) from 0 to 1 (a rich condition to a lean condition) when the $O_2$ sensor 13 continuously outputs a lean signal (VOM≦$V_{R1}$) for more than a predetermined time period (TDL) (steps 303 and 304 through 309). CDLY in the flowchart is a counter for determining the timing for reversing the value of the flag F1. In this embodiment, TDL in step 307 is a negative constant and TDR in step 313 is a positive constant.

At steps 316 through 324 in FIG. 4, the value of FAF is adjusted in accordance with the value of the flag F1 set by the steps explained above. At step 316, it is determined whether the air-fuel ratio of the exhaust gas is reversed (i.e., changed from a rich air-fuel ratio to a lean air-fuel ratio, or vice versa) since the routine was last carried out, by determining whether the value of F1 changed from 1 to 0 or 0 to 1. If the value of F1 changed from 1 to 0 (a rich condition to a lean condition) since the routine was last carried out (steps 316 and 317), the value of FAF is increased step-wise by a relatively large amount RSR (step 318), and if the value of F1 changed from 0 to 1 (a lean condition to a rich condition) since the routine was last carried out (steps 316 and 317), the value of FAF is decreased step-wise by a relatively large amount RSL (step 319). If the value of F1 did not change since the routine was last carried out, and if the value of F1 is 0, the value of FAF is increased by a relatively small amount KIR every time the routine is carried out, as long as the value of F1 is 0 (steps 316, 320 and 321). Similarly, if the value of F1 did not change, and if the value of F1 is 1, the value of FAF is decreased by a relatively small amount KIL every time the routine is carried out (steps 316, 320 and 322). Namely, when the value of F1 did not reverse, the value of FAF is gradually increased or decreased in accordance with whether the air-fuel ratio of exhaust gas (F1) is rich or lean. Further, the value of FAF is restricted by the maximum value (for example, 1.2) and the minimum value (for example, 0.8) to keep the value of FAF within the range determined by the maximum and the minimum values (step 323). Then, the routine terminates this time, after setting the value of the flag XMFB at 1 at step 324.

Figure 5:
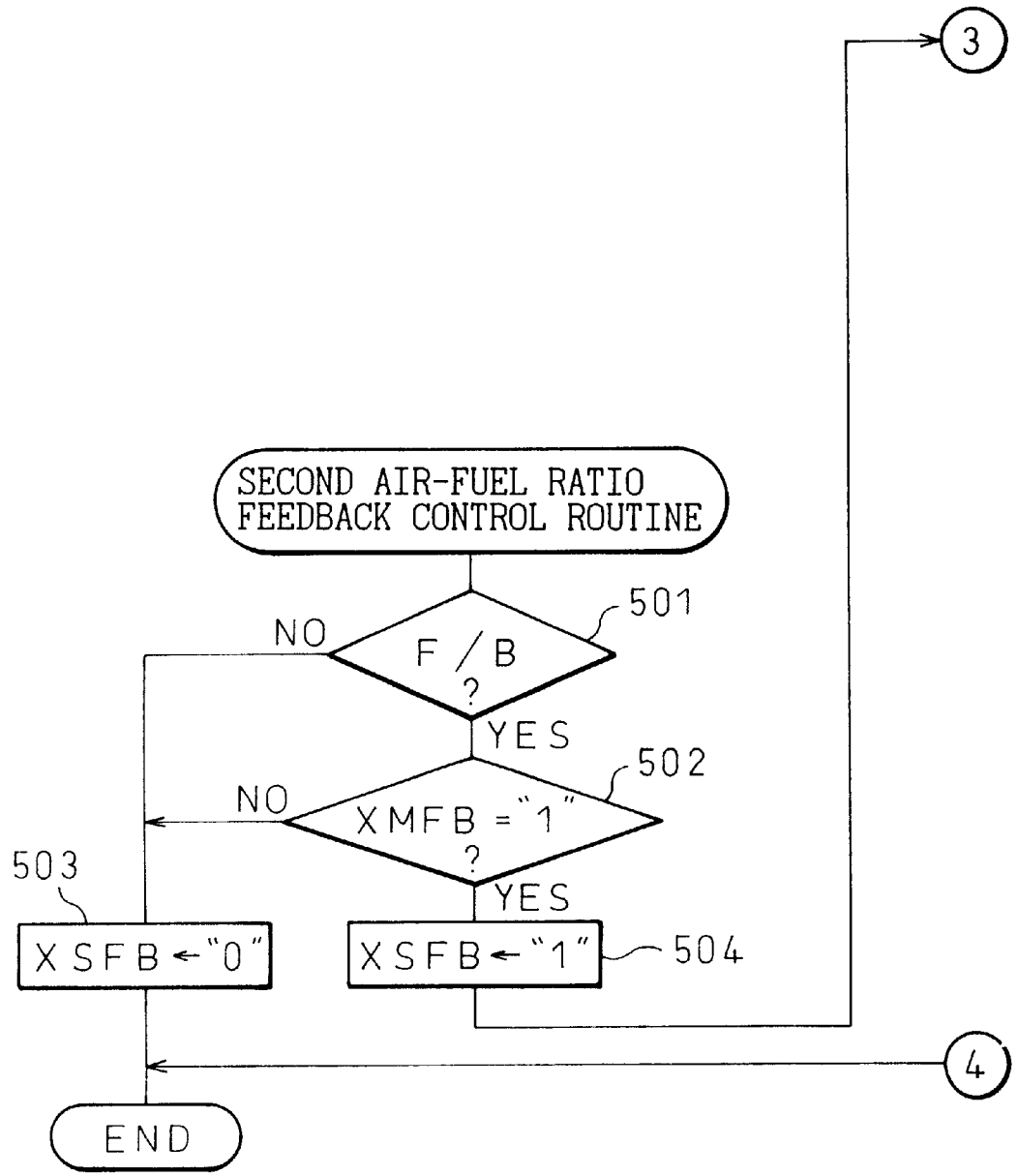
FIGS. 5 and 6 are a flowchart illustrating a second air-fuel ratio feedback control in the first embodiment according to the present invention.
Figure 6:
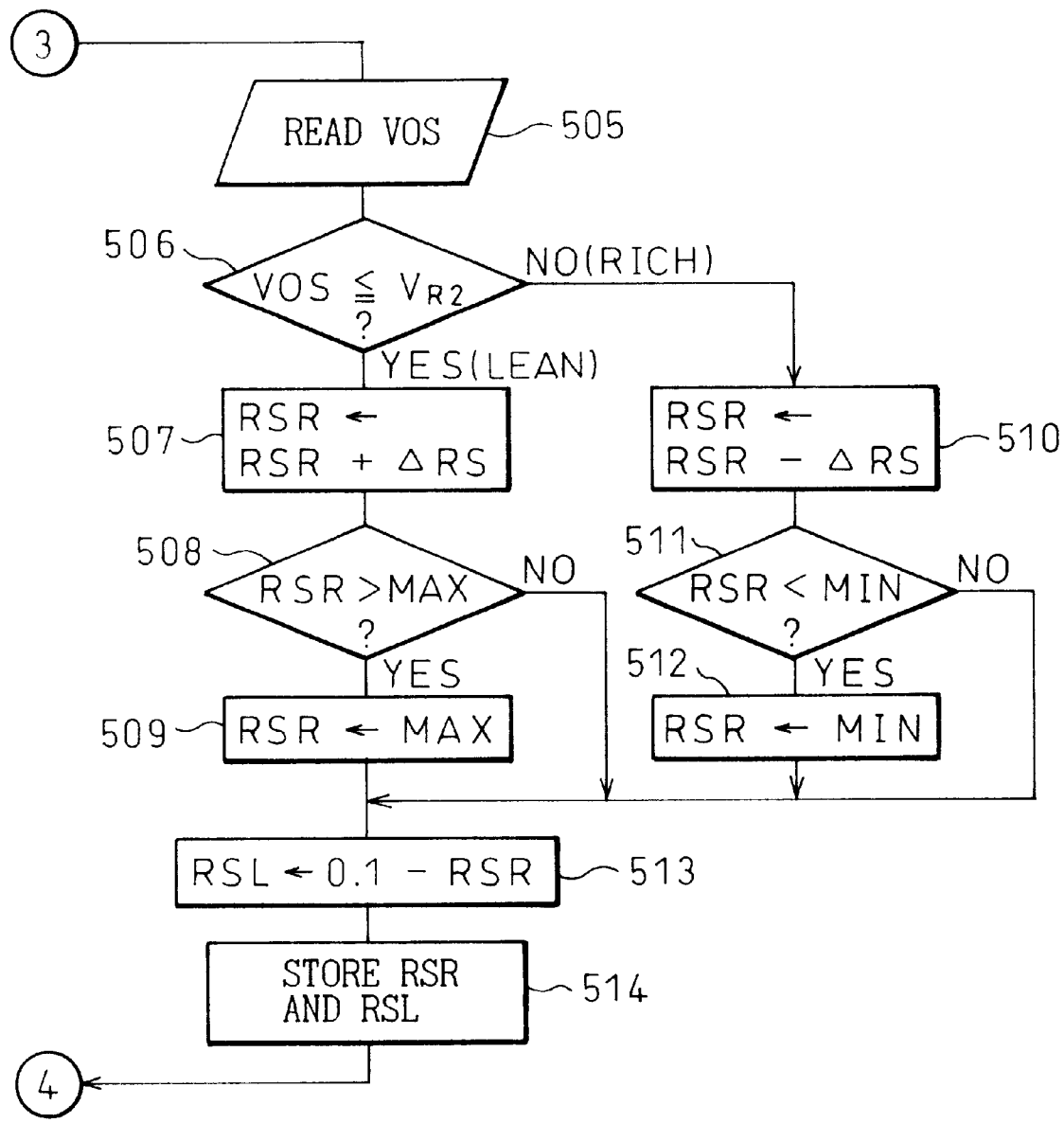

Next, a second air-fuel ratio control in which the values of RSR and RSL are determined in accordance with the output VOS of the downstream $O_2$ sensor 15 is explained. FIGS. 5 and 6 are a flowchart illustrating the second air-fuel ratio control routine of the present embodiment. In this routine, values of second air-fuel ratio correction factors RSR and RSL are calculated in accordance with the output of the downstream $O_2$ sensor 15. This routine is normally carried out at time intervals longer than that of the first air-fuel ratio control routine control (for example, every 500 ms).

In this routine, the output voltage VOS of the downstream $O_2$ sensor 15 is compared with a reference voltage $V_{R2}$, and the amounts RSR and RSL used in the first air-fuel ratio control routine changes in accordance with whether VOS is larger or smaller than $V_{R2}$. The reference voltage $V_{R2}$ is an output voltage of the downstream $O_2$ sensor 15 which corresponds to the stoichiometric air-fuel ratio. When VOS>$V_{R2}$, i.e., when the air-fuel ratio of the exhaust gas downstream of the catalyst is rich compared to the stoichiometric air-fuel ratio, the amount RSR is decreased, and at the same time, the amount RSL is increased. Similarly, when VOS≦$V_{R2}$, i.e., when the air-fuel ratio of the exhaust gas downstream of the catalyst is lean compared to the stoichiometric air-fuel ratio, the amount RSR is increased and the amount RSL is decreased simultaneously. When the amount RSR becomes larger, the value of FAF also becomes larger and, thereby, the fuel injection amount determined by the routine in FIG. 2 becomes larger. On the contrary, when the amount RSL becomes larger, the value of FAF becomes smaller, and the fuel injection amount becomes smaller. Therefore, even when the characteristics of the elements in the fuel system changes, the deviation from the design characteristics is corrected by the change in the values of RSR and RSL and, thereby the air-fuel ratio of the engine is maintained at the stoichiometric air-fuel ratio.

The flowchart of the second air-fuel ratio control routine in FIGS. 5 and 6 is explained hereinafter in brief.

In FIG. 5, at steps 501 and 502, it is determined whether the conditions for carrying out the second air-fuel ratio control is satisfied. The conditions determined at step 501 are whether the operation of the engine is not in the idling operation in addition to the conditions similar to the conditions determined at step 301 in FIG. 3. However, in this routine, it is determined at step 502 whether the first air-fuel ratio control routine is being carried out on the basis of the value of the flag XMFB. If all the conditions in step 501 are satisfied, and the first air-fuel ratio control routine is being carried out, a value of the flag XSFB is set at 1 at step 504, and the values of RSR and RSL are adjusted at the steps 505 through 514 in FIG. 6. If any of conditions in step 501 are not satisfied, or if the first air-fuel ratio control routine is interrupted, the value of the flag XSFB is set at 0 at step 503, and the routine terminates immediately. XSFB is a flag representing whether the second air-fuel ratio control is being carried out, and XSFB=1 means that the second air-fuel ratio control is being carried out, and XSFB=0 means that the second air-fuel ratio control is interrupted.

At steps 505 through 514, the value of RSR is increased or decreased in accordance with whether the air-fuel ratio of the exhaust gas detected by the downstream $O_2$ sensor 15 is rich or lean. Namely, at step 505, the output VOS of the downstream $O_2$ sensor 15 is read through the A/D converter. At step 506, VOS is compared with the reference voltage $V_{R2}$, to determine whether the air-fuel ratio of the exhaust gas downstream of the catalyst is rich or lean. If $VOS \leq V_{R2}$ (lean), the value of RSR is increased by an amount $\Delta RS$ at step 507, and after that, the value of RSR is restricted by the maximum value MAX at steps 508 and 509 (for example MAX=0.09 in this embodiment). Similarly, the value of RSR is decreased by the amount $\Delta RS$ if $VOS > V_{R2}$ (rich) at step 510, and after that, the value of RSR is restricted by the minimum value MIN at steps 511 and 512 (for example, MIN=0.01 in this embodiment). The value of RSL is, then, calculated at step 513 by RSR=0.1−RSR. Namely, the sum of the values of RSR and RSL is always maintained at a constant value 0.1. Therefore, in the second air-fuel ratio control, when the downstream $O_2$ sensor outputs a rich air-fuel ratio signal (i.e., $VOS > V_{R2}$), RSR is decreased and RSL is increased simultaneously, and when the downstream $O_2$ sensor outputs a lean air-fuel ratio signal (i.e., $VOS \leq V_{R2}$), RSR is increased and RSL is decreased simultaneously.

FIGS. 7(*a*) through 7(*d*) show changes in the values of the counter CDLY (the curve in FIG. 7(*b*)), the flag F1 (the curve in FIG. 7(*c*)) and FAF (the curve in FIG. 7(*d*)) in accordance with the change in the air-fuel ratio (A/F) detected by the upstream $O_2$ sensor 13 (the curve in FIG. 7(*a*)) when the air-fuel ratio is controlled by the routines in FIGS. 3, 4 and 5, 6. As shown by the curve in FIG. 7(*a*), the value of the flag F1 does not immediately change from 0 to 1 even when the air-fuel ratio A/F detected by the upstream $O_2$ sensor 13 changes from a lean air-fuel ratio to a rich air-fuel ratio. The value of F1 changes from 0 to 1 only when the value of the counter CDLY increases from 0 to TDR (TDR>0), i.e., the value of F1 changes from 0 to 1 when a period corresponding to the value of TDR (shown by $T_1$ in FIG. 7(*c*)) has elapsed after A/F changed from a lean air-fuel ratio to a rich air-fuel ratio. Similarly, the value of F1 changes from 1 to 0 when a time period (shown by $T_2$ in FIG. 7(*c*)) corresponding to the value of TDL (TDL<0) has elapsed after A/F changed from a rich air-fuel ratio to a lean air-fuel ratio. Consequently, the value of F1 does not change even if A/F changes for a short time (shown by N in FIG. 7(*a*)) due to, for example, noise in the output signal of the upstream $O_2$ sensor and, thereby, the stability of the air-fuel ratio control in FIGS. 3 through 6 is increased.

As a result of the first and the second air-fuel ratio feedback control, the air-fuel ratio correction factor FAF fluctuates regularly around a center value 1.0, and the operating air-fuel ratio of the engine regularly alternates between a rich air-fuel ratio and a lean air-fuel ratio. Further, as seen from the curve in FIG. 7(*d*), if the value of RSR is increased and the value of RSL is simultaneously decreased by the second air-fuel ratio control in FIGS. 5 and 6, the value of FAF fluctuates largely to a rich air-fuel ratio side than to a lean air-fuel ratio side and, thereby, the air-fuel ratio of the engine, as a whole, shifts to a rich air-fuel ratio side. Similarly, when the value of RSR is decreased (the value of RSL is increased) by the second air-fuel ratio control, the air-fuel ratio of the engine, as a whole, shifts to a lean air-fuel ratio side. Therefore, when the values of RSR and RSL are changed by the second air-fuel ratio control, the air-fuel ratio of the exhaust gas flowing into the catalyst shifts to a rich air-fuel ratio side or lean air-fuel ratio side.

Next, the principle of the detection of deterioration of the catalytic converter in this embodiment is explained.

In this embodiment, deterioration of the catalyst is detected by determining the deterioration of the $O_2$ storage capability of the catalyst. As explained before, the catalyst carries out an $O_2$ storage operation which absorbs oxygen in the exhaust gas when the air-fuel ratio of the exhaust gas flowing into the catalyst is lean, and releases the absorbed oxygen when the air-fuel ratio of the exhaust gas flowing into the catalyst is rich. Due to this $O_2$ storage operation, the fluctuation of the air-fuel ratio of the exhaust gas flowing out from the catalyst becomes small even when the air-fuel ratio of the exhaust gas flowing into the catalyst fluctuates between a rich air-fuel ratio and a lean air-fuel ratio regularly as shown by the curve in FIG. 8(*a*). However, as deterioration of the catalyst proceeds, the $O_2$ storage capability of the catalyst becomes low, and the maximum amount of oxygen stored in the catalyst decreases. Therefore, when the catalyst deteriorates, the catalyst releases all the oxygen stored therein within the rich period in which the air-fuel ratio of the exhaust gas is on a rich air-fuel ratio side, and thereafter, since no oxygen is released from the catalyst, the air-fuel ratio of the exhaust gas flowing out from the catalyst becomes the same as the air-fuel ratio of the exhaust gas flowing into the catalyst (FIG. 8(*b*)). Namely, the air-fuel ratio of the exhaust gas downstream of the catalyst fluctuates in the same manner as that of the exhaust gas upstream of the catalyst and, thereby, the length per unit time of the response curve of the output of the downstream $O_2$ sensor increases.

Therefore the deterioration of the catalyst can be determined by monitoring the length per unit time of the response curve of the output of the downstream air-fuel ratio sensor 15 to some extent.

Figure 8A:
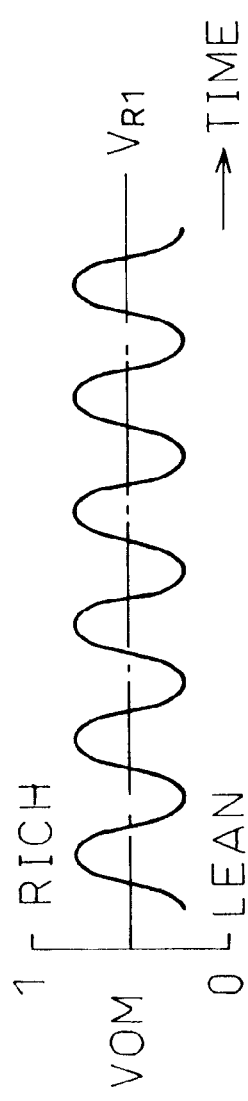
FIGS. 8(a) through 8(c) schematically illustrate a change in the fluctuation of the output of the downstream air-fuel ratio sensor in accordance with the deterioration of the catalyst.
Figure 8B:
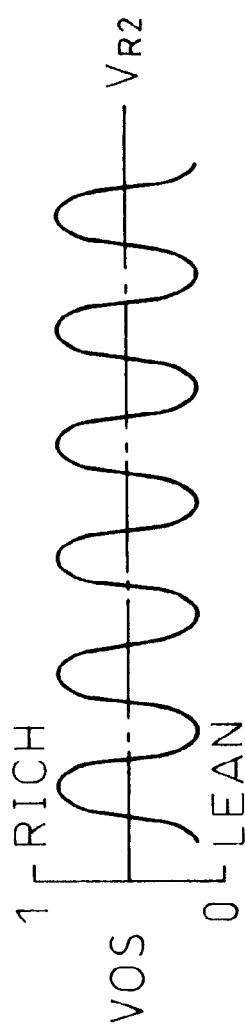
Figure 8C:
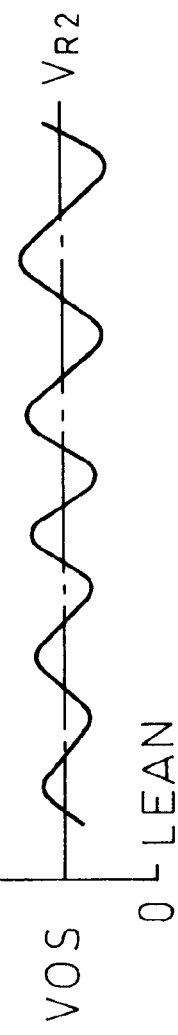

However, as mentioned above, if the catalyst is partially broken, or if the downstream $O_2$ sensor deteriorates, the length of the response curve of the output of the downstream $O_2$ sensor does not increase to the degree that the catalyst is determined as being deteriorated (FIG. 8(*c*)). Therefore, the problem occurs that the catalyst may not be determined as being deteriorated by monitoring the length of the response curve of the output of the downstream $O_2$ sensor.

Figure 9:
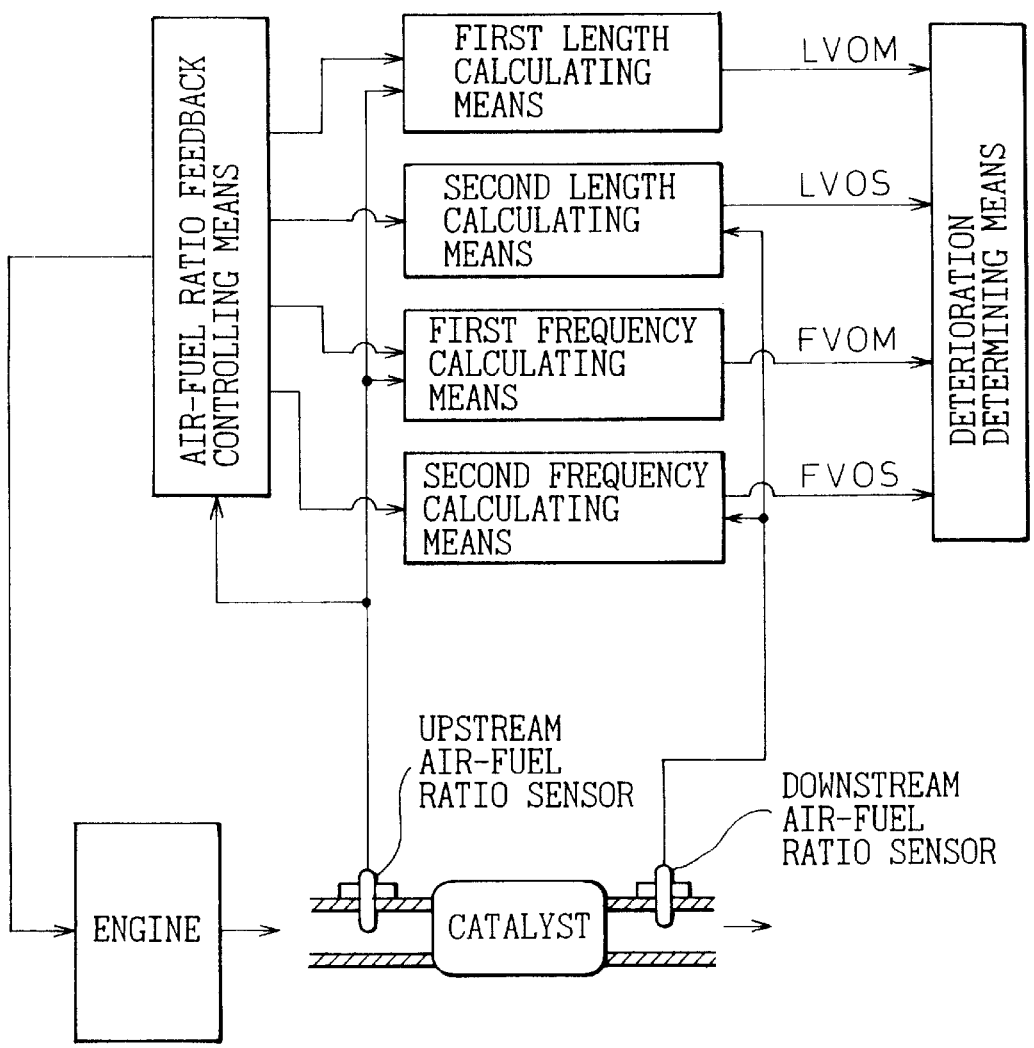
FIG. 9 is a block diagram showing the relation among components of the first embodiment of the present invention.
Figure 10:
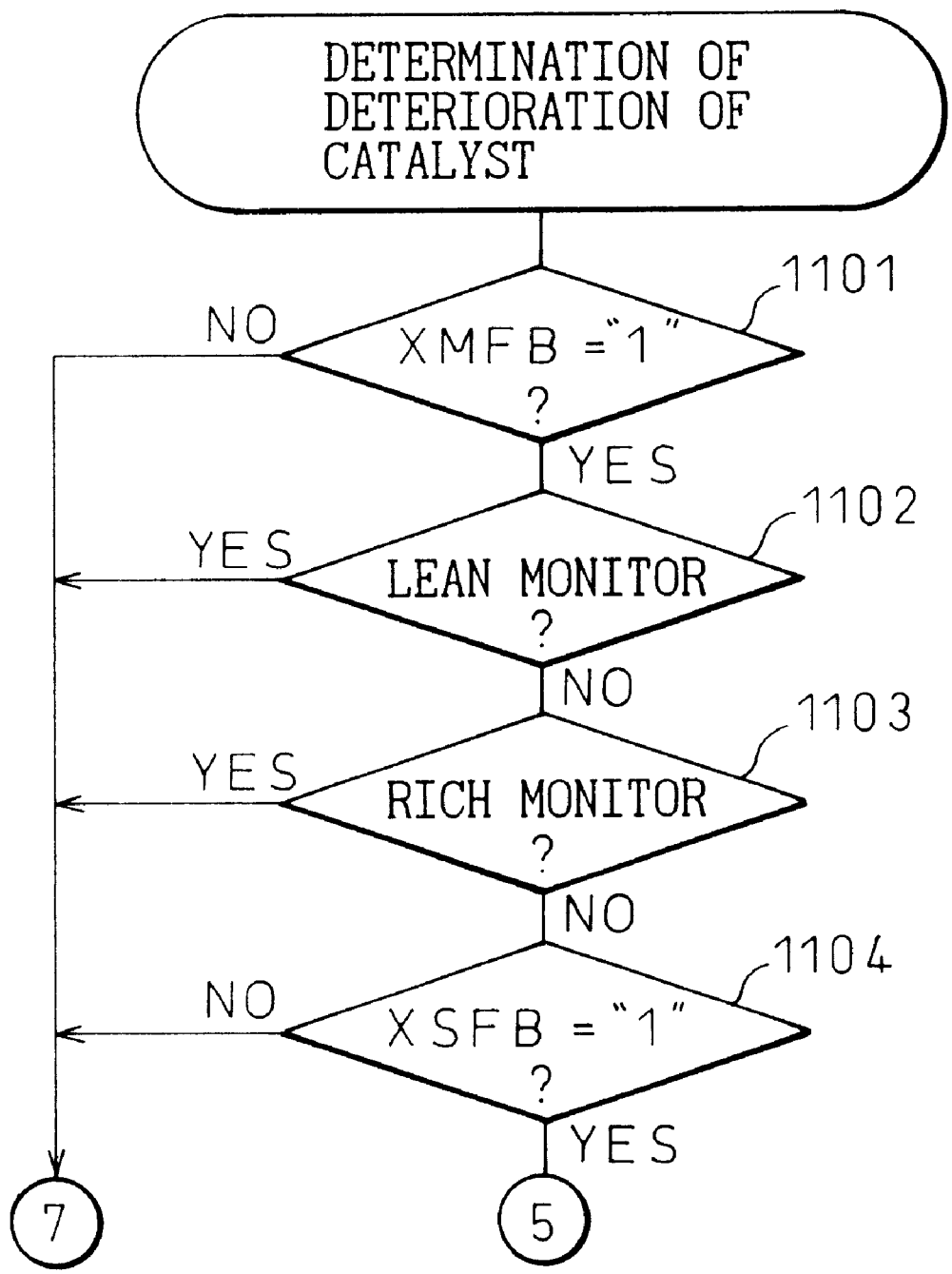
FIGS. 10 to 13 are a flowchart illustrating a determination of deterioration of the catalyst in the first embodiment according to the present invention.
Figure 11:
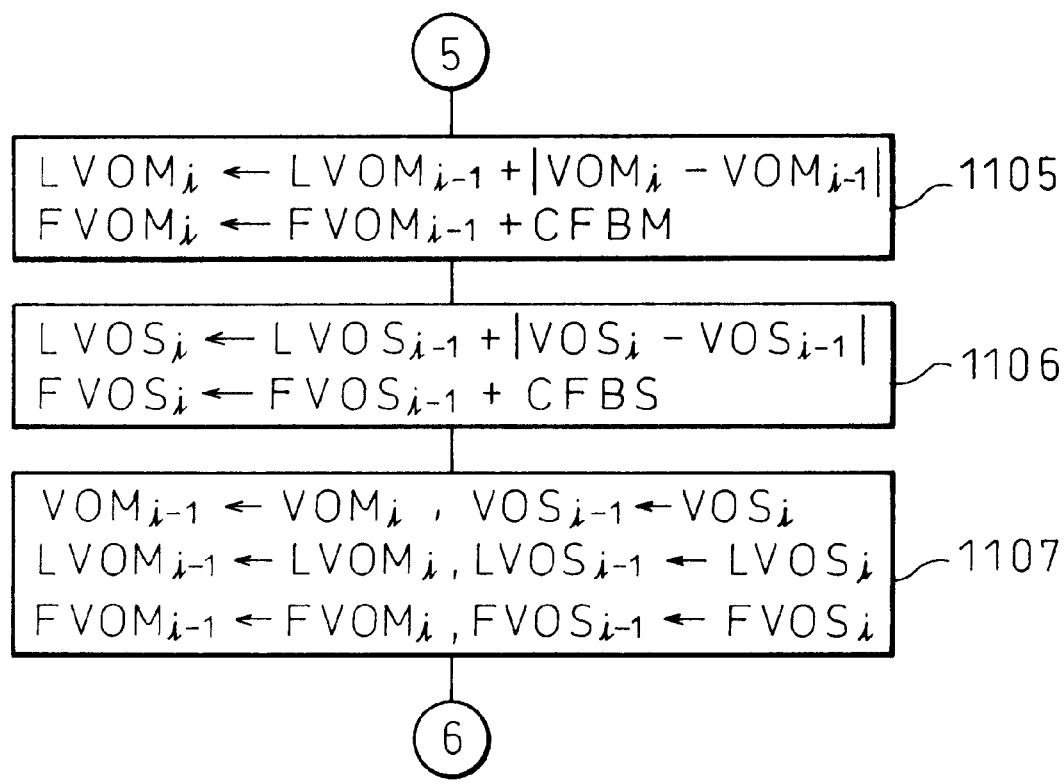

According to the embodiment, the above problem is solved by a device shown in FIG. 9. The device comprises an air-fuel ratio sensor for detecting the air-fuel ratio of the exhaust gas, which sensor is disposed in the exhaust passage upstream of a catalyst which has an $O_2$ storage capability, and an air-fuel ratio sensor for detecting the air-fuel ratio of the exhaust gas, which sensor is disposed in the exhaust passage downstream of the catalyst. The device further comprises air-fuel ratio feedback controlling means for feedback controlling the air-fuel ratio of the engine to the stoichiometric air-fuel ratio on the basis of, at least, the output voltage VOM of the upstream air-fuel ratio sensor.

The device further comprises first length calculating means for calculating the length LVOM of the response curve of the output of the upstream air-fuel ratio sensor for a predetermined time period during the air-fuel ratio feedback control by the air-fuel ratio feedback controlling means, and second length calculating means for calculating the length LVOS of the response curve of the output of the downstream air-fuel ratio sensor for the predetermined time period during the air-fuel ratio feedback control by the air-fuel ratio feedback controlling means.

The device further comprises first frequency calculating means for calculating the frequency FVOM of the output of the upstream air-fuel ratio sensor and second frequency calculating means for calculating the frequency FVOS of the output of the downstream air-fuel ratio sensor. The factor for calculating the frequency of the output of each air-fuel ratio sensor is counted up when the output voltage VOM of the upstream air-fuel ratio sensor reaches a reference voltage $V_{R1}$ for the predetermined time period during the air-fuel ratio feedback control by the air-fuel ratio feedback controlling means.

The device further comprises deterioration determining means for calculating the ratio LVOS/LVOM of the length of the response curve of the output of the downstream air-fuel ratio sensor to the length of the response curve of the output of the upstream air-fuel ratio sensor, calculating the ratio FVOS/FVOM of the frequency of the output of the downstream air-fuel ratio sensor to the frequency of the output of the upstream air-fuel ratio sensor, and determining the deterioration of the catalyst on the basis of the length ratio LVOS/LVOM and the frequency ratio FVOS/FVOM.

Figure 14:
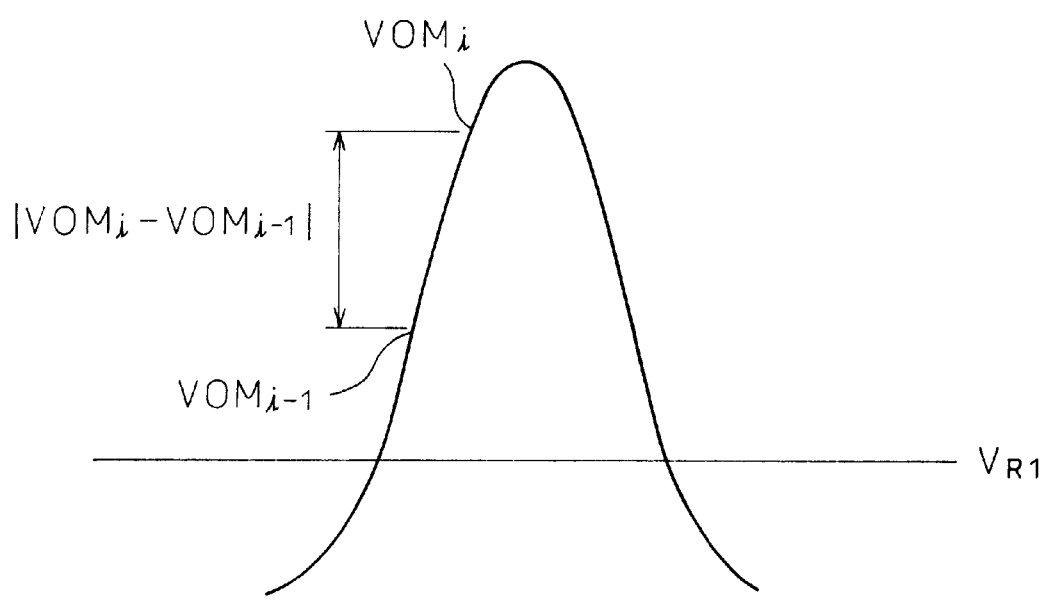
FIG. 14 is a view defining the length $LVOM_i$ of the response curve of the output of the upstream $O_2$ sensor.

In this embodiment, as shown in FIG. 14, the length of the response curve of the output of the upstream $O_2$ sensor is calculated by integrating, for the predetermined time period, the absolute difference ($|VOM_i-VOM_{i-1}|$) between the levels of successive two output signals, i.e., the output voltage $VOM_i$ of the sensor at this time routine and the output voltage $VOM_{i-1}$ of the sensor at the last time routine. Note that, for the easy illustration in FIG. 14, the sampling interval between the output voltage $VOM_i$ of the upstream $O_2$ sensor at this time routine and the output voltage $VOM_{i-1}$ of the upstream $O_2$ sensor at the last time routine is large. Further, the calculated length of the response curve of the output of the sensor may be corrected on the basis of the sampling interval to modify the diversion of the calculated length.

The length of the response curve of the output of the downstream $O_2$ sensor is calculated in a way similar to the above.

As mentioned above, if the catalyst is partially broken, the catalyst may not be determined as being deteriorated on the basis of only the length of the response curve of the output of the downstream $O_2$ sensor, since the output length is not increased to the predetermined length so that the catalyst is determined as being deteriorated.

Further, if the predetermined length is set too small in order to determine deterioration the catalyst which is partially broken, the catalyst which does not deteriorate is incorrectly determined as being deteriorated, when the output of the downstream $O_2$ sensor fluctuates due to noises and thereby the length of the output of the downstream $O_2$ sensor is increased.

On the other hand, the catalyst may not be correctly determined as being deteriorated on the basis of only the frequency of the output of the downstream $O_2$ sensor, since, when the catalyst deteriorates a little, the output frequency becomes similar to that of the upstream $O_2$ sensor in spite of the degree of the deterioration of the catalyst.

According to the present invention, it is determined if the catalyst has deteriorated on the basis of the length ratio of the $O_2$ sensors and the frequency ratio of the $O_2$ sensors.

In the first embodiment, when the length ratio is greater than the first predetermined ratio, it is determined that the catalyst deteriorates. Further, when the length ratio is greater than the second predetermined ratio which is smaller than the first predetermined ratio, and the frequency ratio is greater than the third predetermined ratio, it is determined that the catalyst deteriorates.

FIGS. 10 to 13 are a flowchart illustrating a determination of deterioration of the catalyst in the first embodiment according to the present invention. The routine in FIGS. 10 to 13 is carried out by the control circuit 10 at a predetermined intervals.

At step 1101, it is judged if the first air-fuel ratio control is being carried out (XMFB=1). At step 1101, when XMFB=1, the routine proceeds to step 1102. On the other hand, when XMFB≠1, the processing cycle is ended.

At step 1102, it is judged by a lean monitor if the upstream $O_2$ sensor continuously outputs a lean signal for more than a predetermined time period. At step 1102, when the upstream $O_2$ sensor continuously outputs a lean signal for more than the predetermined time period, the processing cycle is ended. On the other hand, the upstream $O_2$ sensor does not continuously output a lean signal for more than the predetermined time period, the routine proceeds to step 1103.

At step 1103, it is judged by a rich monitor if the upstream $O_2$ sensor continuously outputs a rich signal for more than a predetermined time period. At step 1103, when the upstream $O_2$ sensor continuously outputs a rich signal for more than the predetermined time period, the processing cycle is ended. On the other hand, the upstream $O_2$ sensor does not continuously output a rich signal for more than the predetermined time period, the routine proceeds to step 1104.

At step 1104, it is judged if the second air-fuel ratio control is being carried out (XSFB=1). At step 1104, when XSFB=1, the routine proceeds to step 1105 in FIG. 11. On the other hand, when XSFB≠1, the processing cycle is ended.

At the above steps 1101 to 1104, it is judged if the condition of the operation of the engine is the time when the determination of the deterioration of the catalyst can be carried out. According to steps 1101 and 1104, the determination of the deterioration of the catalyst can not be carried out when either of the first or second air-fuel ratio control is not being carried out. Further, according to steps 1102 and 1103, the determination of the deterioration of the catalyst can not be carried out when the upstream $O_2$ sensor continuously outputs a lean signal or a rich signal for more than a predetermined time period since a effective length of the response curve and a effective frequency of the output of the upstream $O_2$ sensor cannot be obtained. Thus, the determination of the deterioration of the catalyst is carried out when the output of the upstream $O_2$ sensor fluctuates as shown in FIG. 8(a).

At step 1105, the absolute length $|VOM_i-VOM_{i-1}|$ of the response curve of the output of the upstream $O_2$ sensor between the output voltage $VOM_{i-1}$ of the upstream $O_2$ sensor at the last time routine and the output voltage $VOM_i$ of the upstream $O_2$ sensor at this time routine is added to the length $LVOM_{i-1}$ of the response curve of the output of the upstream $O_2$ sensor which length $LVOM_{i-1}$ is integrated until the last time routine, and the frequency CFBM of the output of the upstream $O_2$ sensor between the last time routine and this time routine, which frequency CFBM is calculated according to the routine for calculating the frequency of the output of the $O_2$ sensors described later, is added to the frequency $FVOM_{i-1}$ of the output of the upstream $O_2$ sensor which frequency $FVOM_{i-1}$ is integrated until the last time routine, and then the routine proceeds to step 1106.

At step 1106, the absolute length $|VOS_i-VOS_{i-1}|$ of the response curve of the output of the downstream $O_2$ sensor between the output voltage $VOS_{i-1}$ of the downstream $O_2$ sensor at the last time routine and the output voltage $VOS_i$ of the downstream $O_2$ sensor at this time routine is added to the length $LVOS_{i-1}$ of the response curve of the output of the downstream $O_2$ sensor which length $LVOS_{i-1}$ is integrated until the last time routine, and the frequency CFBS of the output of the downstream $O_2$ sensor between the last time routine and this time routine, which frequency CFBS is calculated according to the routine for calculating the frequency of the output of the $O_2$ sensors described later, is added to the frequency $FVOS_{i-1}$ of the output of the upstream $O_2$ sensor which frequency $FVOS_{i-1}$ is integrated until the last time routine, and then the routine proceeds to step 1107.

Figure 12:
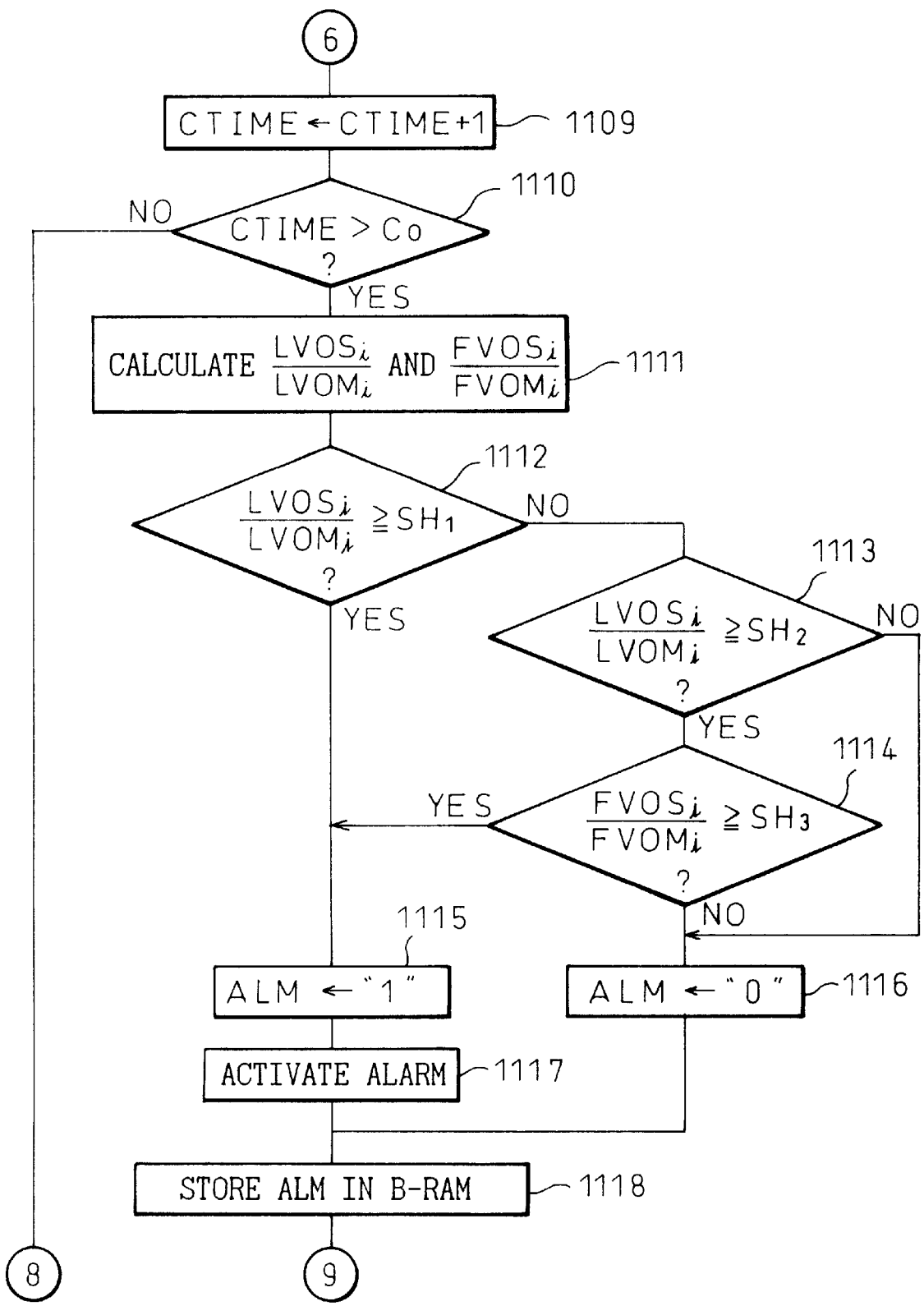
Figure 13:
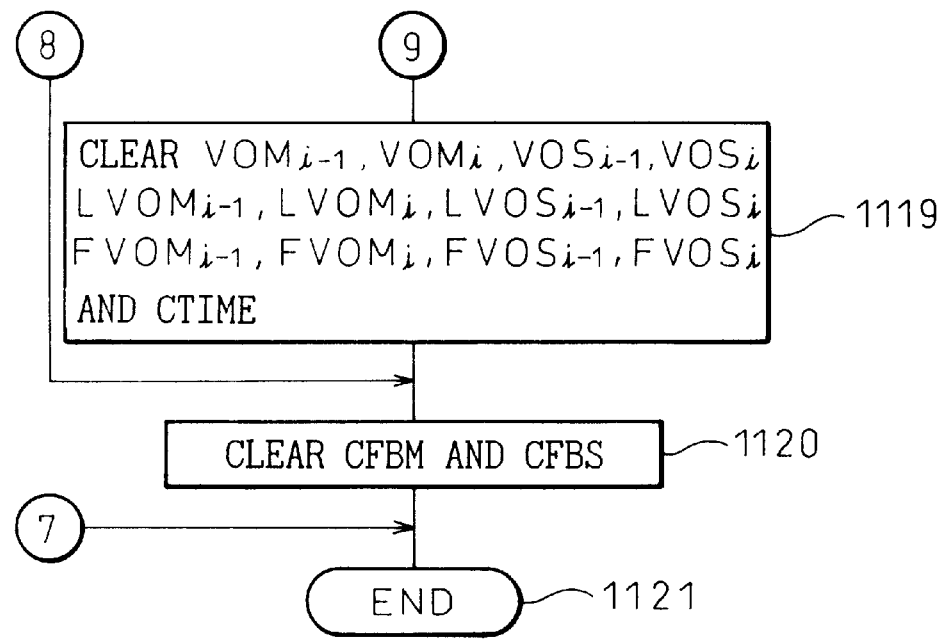

At step 1107, $VOM_{i-1}$ is renewed by $VOM_i$, $VOS_{i-1}$ is renewed by $VOS_i$, $LVOM_{i-1}$ is renewed by $LVOM_i$, $LVOS_{i-1}$ is renewed by $LVOS_i$, $FVOM_{i-1}$ is renewed by $FVOM_i$, and $FVOS_{i-1}$ is renewed by $FVOS_i$, and the routine proceeds to step 1108 in FIG. 12.

At step 1109, the counter CTIME is counted up, and the routine proceeds to step 1110.

At step 1110, it is judged if the counter CTIME is greater than a predetermined value $C_o$ (CTIME>$C_o$). At step 1110, when CTIME>$C_o$, the routine proceeds to step 1111, where the length ratio $LVOS_i/LVOM_i$ and the frequency ratio $FVOS_i/FVOM_i$ are calculated, and the routine proceeds to step 1112. On the other hand, at step 1110, when CTIME≦$C_o$, the routine proceeds to step 1120 in FIG. 13, where CFBM and CFBS are cleared, and the processing cycle is ended.

At step 1112, it is judged if the length ratio $LVOS_i/LVOM_i$ is greater than or equal to the first predetermined ratio $SH_1$ ($LVOS_i/LVOM_i≧SH_1$). At step 1112, when $LVOS_i/LVOM_i≧SH_1$, the routine proceeds to step 1115, where the alarm flag ALM is set (ALM is set to "1"), the routine proceeds to step 1117, where the alarm is activated, the routine proceeds to step 1118, where ALM is stored in B-RAM as data for the maintenance of the catalyst, and the routine proceeds to step 1119. On the other hand, at step 1112, when $LVOS_i/LVOM_i<SH_1$, the routine proceeds to step 1113.

At step 1113, it is judged if the length ratio $LVOS_i/LVOM_i$ is greater than or equal to the second predetermined ratio $SH_2$ ($LVOS_i/LVOM_i≧SH_2$). At step 1113, when $LVOS_i/LVOM_i≧SH_2$, the routine proceeds to step 1114. On the other hand, at step 1113, when $LVOS_i/LVOM_i<SH_2$, the routine proceeds to step 1116, where the alarm flag ALM is reset (ALM is set to "0"), the routine proceeds to step 1118, where ALM is stored in B-RAM, and the routine proceeds to step 1119.

At step 1114, it is judged if the frequency ratio $FVOS_i/FVOM_i$ is greater than or equal to the third predetermined ratio $SH_3$ ($FVOS_i/FVOM_i≧SH_3$). At step 1114, when $FVOS_i/FVOM_i≧SH_3$, the routine proceeds to step 1115, where the alarm flag ALM is set (ALM is set to "1"), the routine proceeds to step 1117, where the alarm is activated, the routine proceeds to step 1118, where ALM is stored in B-RAM, and the routine proceeds to step 1119 in FIG. 13. On the other hand, at step 1114, when $FVOS_i/FVOM_i<SH_3$, the routine proceeds to step 1116, where the alarm flag ALM is reset (ALM is set to "0"), the routine proceeds to step 1118, where ALM is stored in B-RAM and the routine proceeds to step 1119 in FIG. 13.

According to steps 1112 to 1114, it is determined if the catalyst has deteriorated. When it is determined that the catalyst has deteriorated, the alarm flag ALM is set, and the alarm is activated. On the other hand, when it is determined that the catalyst has not deteriorated, the alarm flag ALM is reset.

At step 1119, $VOM_{i-1}$, $VOM_i$, $VOS_{i-1}$, $VOS_i$, $LVOM_{i-1}$, $LVOM_i$, $LVOS_{i-1}$, $LVOS_i$, $FVOM_{i-1}$, $FVOM_i$, $FVOS_{i-1}$, $FVOS_i$, and CTIME are cleared, and the routine proceeds to step 1120.

At step 1120, CFBM and CFBS are cleared, and the processing cycle is ended.

Figure 15:
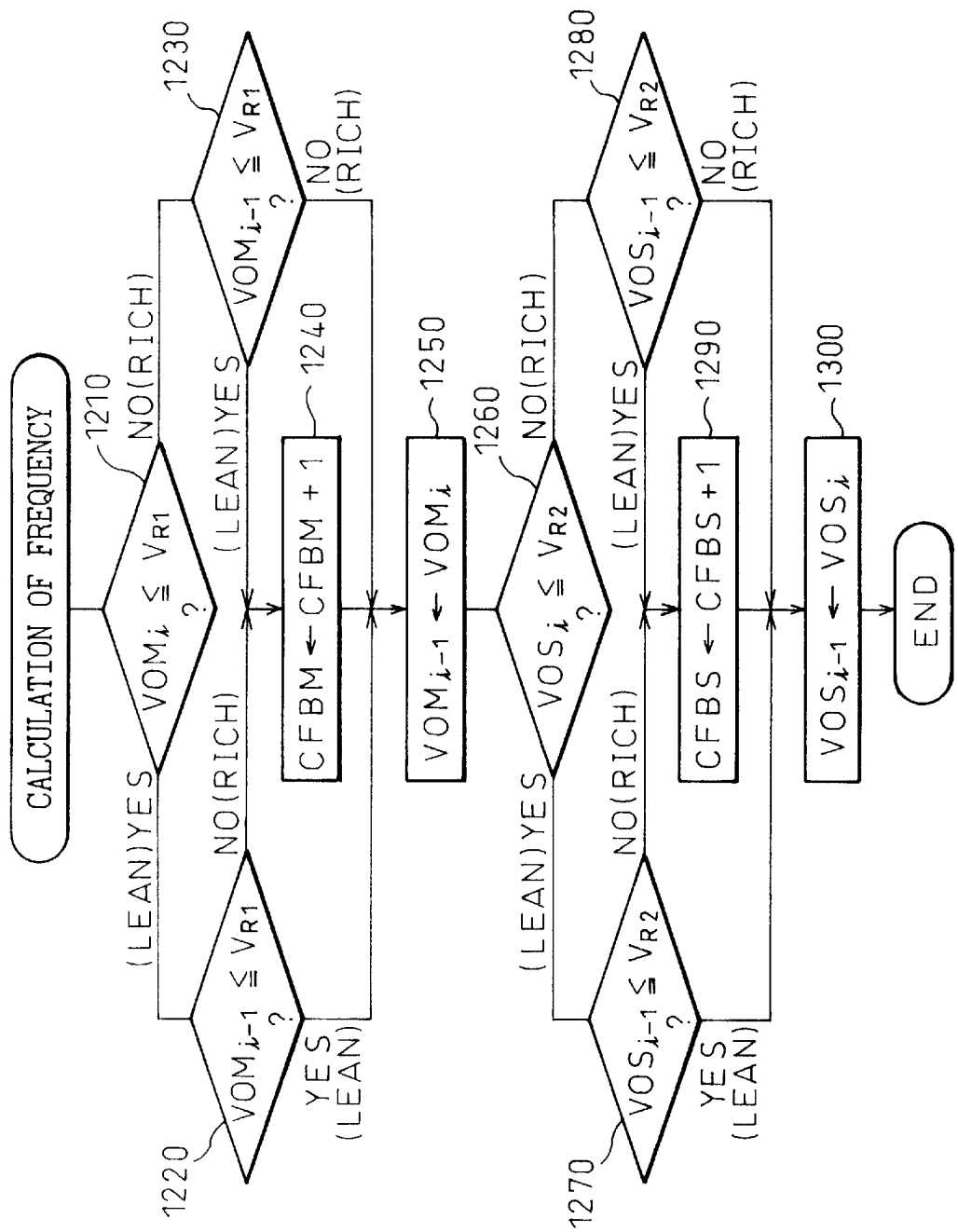
FIG. 15 is a flowchart illustrating a calculation of the frequency of the output of the $O_2$ sensors in the first embodiment according to the present invention.
Figure 16:
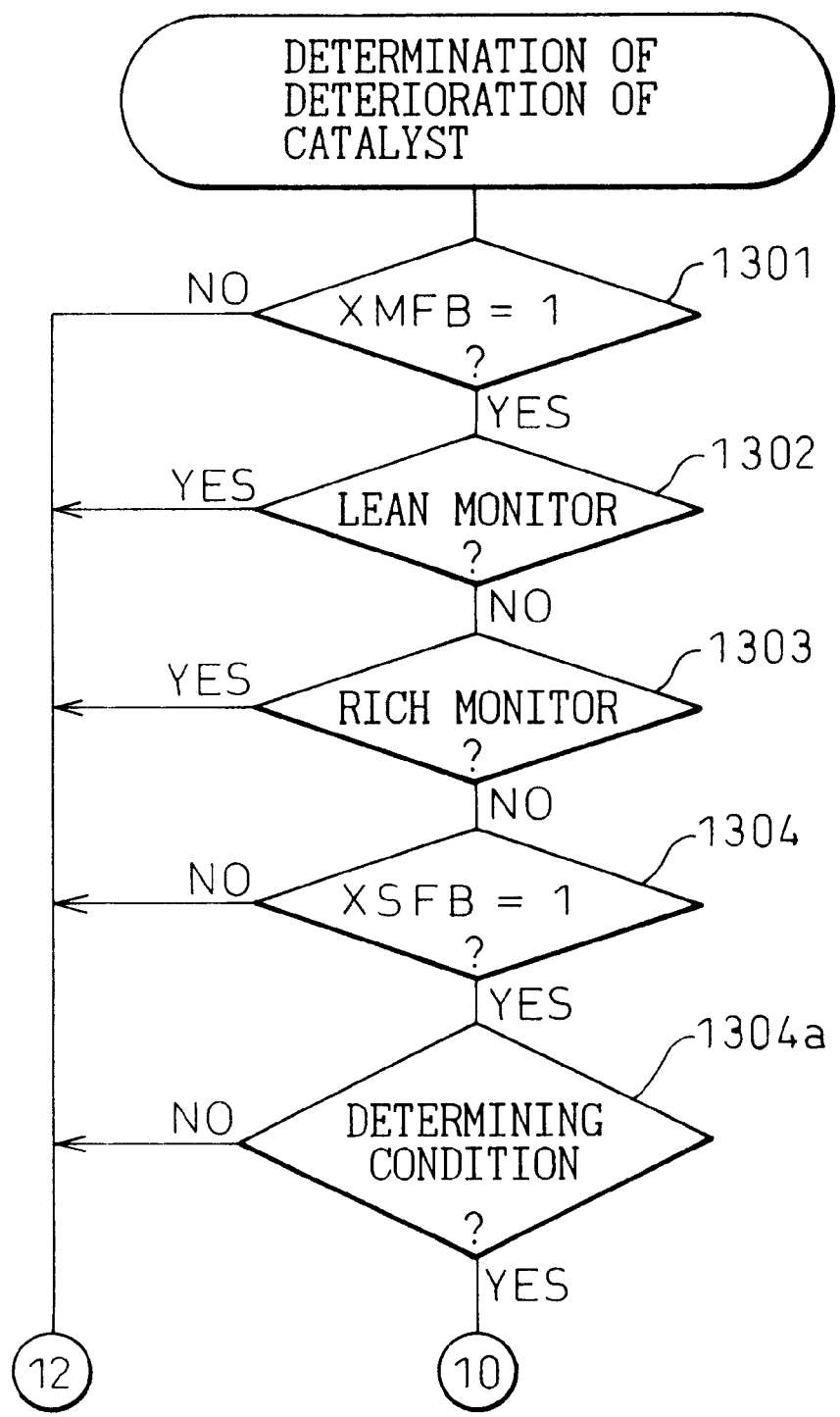
FIGS. 16 to 19 are a flowchart illustrating a determination of deterioration of the catalyst in the second embodiment according to the present invention.
Figure 17:
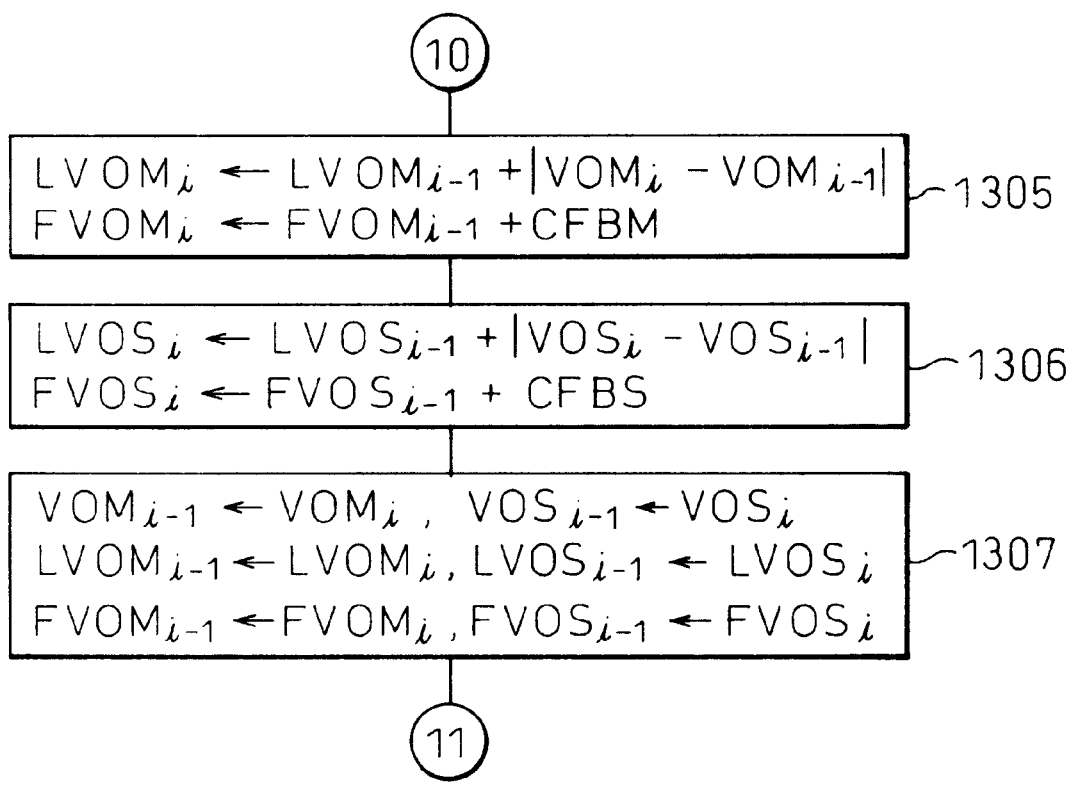
Figure 18:
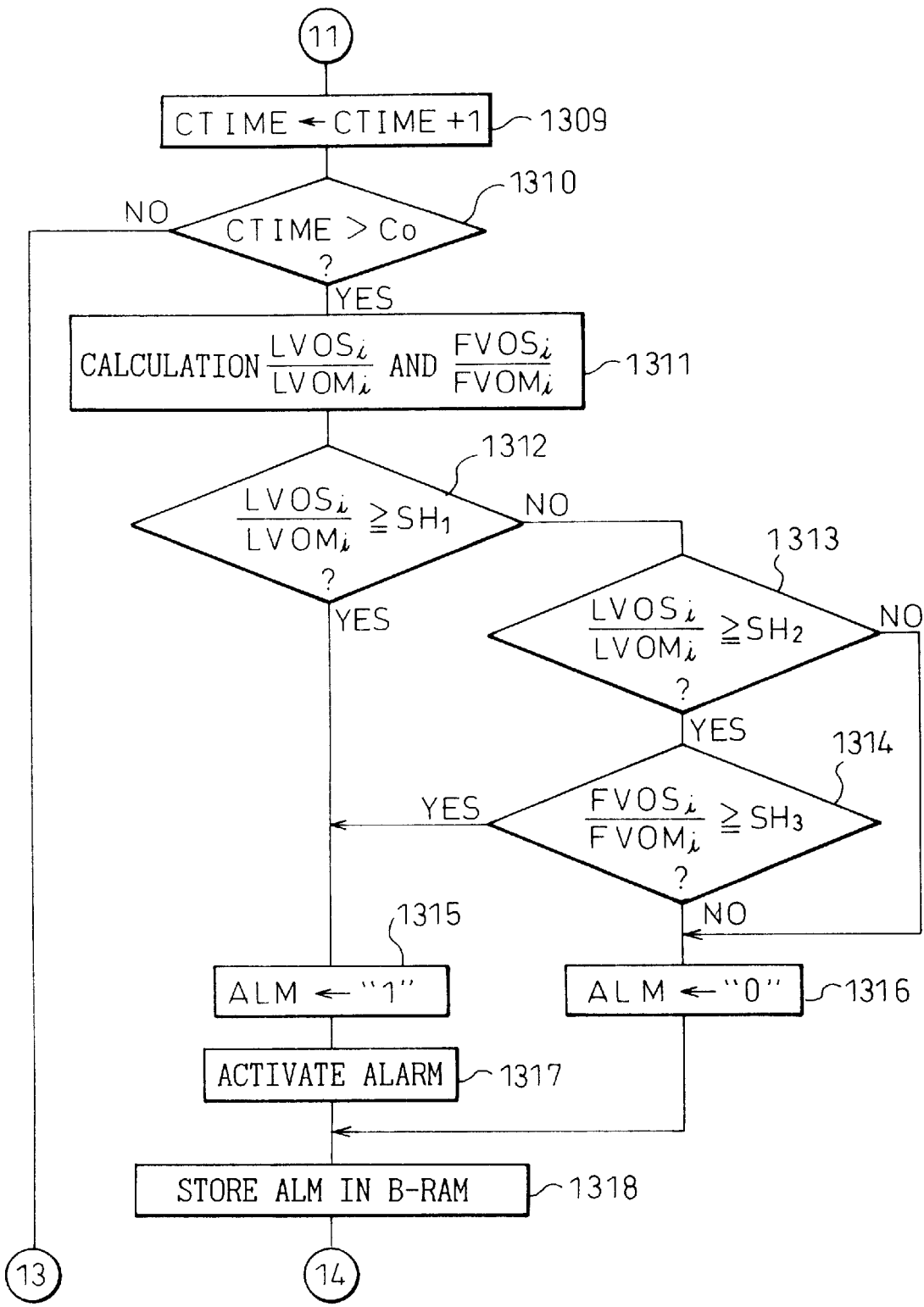
Figure 19:
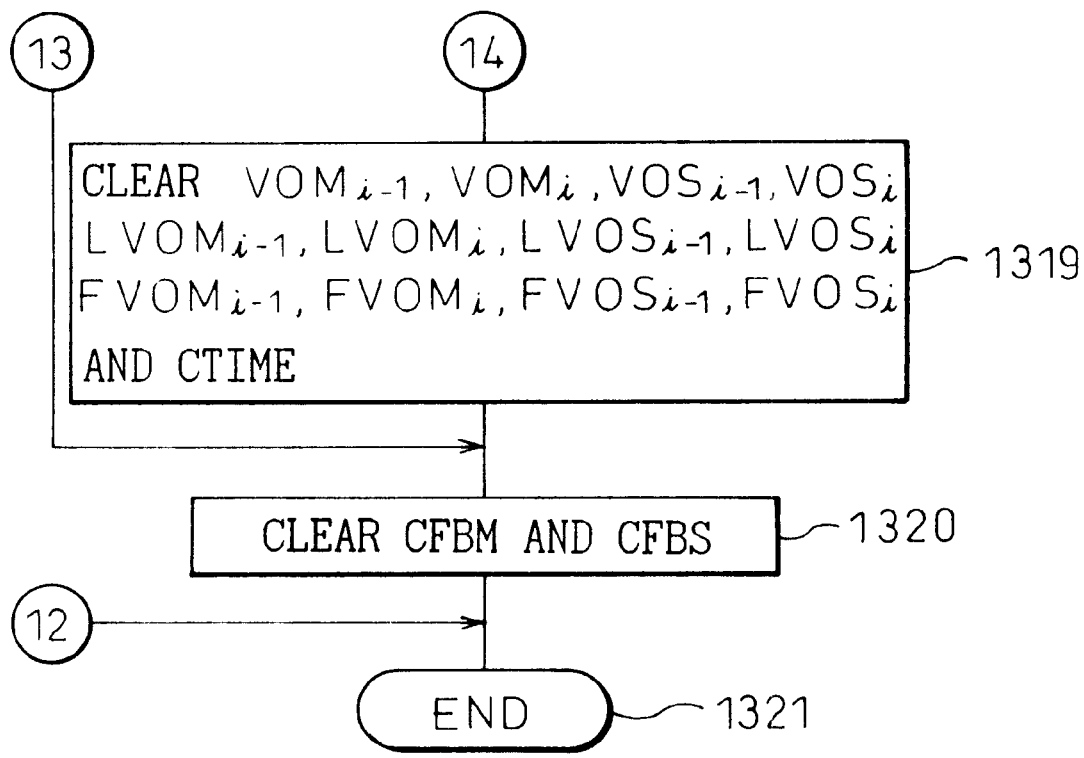

FIG. 15 shows a flowchart illustrating a calculation of frequency of the output of the $O_2$ sensors. At step 1210, it is judged if the output voltage $VOM_i$ of the upstream $O_2$ sensor at this time routine is smaller than or equal to the reference voltage $V_{R1}$ ($VOM_i≦V_{R1}$). At step 1210, when $VOM_i≦V_{R1}$, the routine proceeds to step 1220. On the other hand, when $VOM_i>V_{R1}$, the routine proceeds to step 1230.

At step 1220, it is judged if the output voltage $VOM_{i-1}$ of the upstream $O_2$ sensor at the last time routine is smaller than or equal to the reference voltage $V_{R1}$ ($VOM_{i-1}≦V_{R1}$). At step 1220, when $VOM_i≦V_{R1}$, the routine proceeds to step 1250. On the other hand, when $VOMi-_1>V_{R1}$, the routine proceeds to step 1240, where the factor CFBM for calculating the frequency of the output of the upstream $O_2$ sensor is counted up, and the routine proceeds to step 1250.

At step 1230, it is judged if $VOM_{i-1}$ is smaller than or equal to $V_{R1}$ ($VOM_{i-1}≦V_{R1}$). At step 1230, when $VOM_{i-1}≦V_{R1}$, the routine proceeds to step 1240, where the factor CFBM for calculating the frequency of the output of the upstream $O_2$ sensor is counted up, and the routine proceeds to step 1250. On the other hand, when $VOM_{i-1}>V_{R1}$, the routine proceeds to step 1250.

At step 1250, $VOM_{i-1}$ is renewed by $VOM_i$, and the routine proceeds to step 1260.

At step 1260, it is judged if the output voltage $VOS_i$ of the downstream $O_2$ sensor at this time routine is smaller than or equal to the reference voltage $V_{R2}$ ($VOS_i≦V_{R2}$). At step 1260, when $VOS_i≦V_{R\,2}$, the routine proceeds to step 1270. On the other hand, when $VOS_i>V_{R2}$, the routine proceeds to step 1280.

At step 1270, it is judged if the output voltage $VOS_{i-1}$ of the downstream $O_2$ sensor at the last time routine is smaller than or equal to the reference voltage $V_{R2}$ ($VOM_{i-1}≦V_{R2}$). At step 1270, when $VOS_{i-1}≦V_{R2}$, the routine proceeds to step 1300. On the other hand, when $VOS_{i-1}>V_{R2}$, the routine proceeds to step 1290, where the factor CFBS for calculating the frequency of the output of the upstream $O_2$ sensor is counted up, and the routine proceeds to step 1300.

At step 1280, it is judged if $VOS_{i-1}$ is smaller than or equal to $V_{R2}$ ($VOS_{i-1}≦V_{R2}$). At step 1280, when $VOS_{i-1}≦V_{R2}$, the routine proceeds to step 1290, where the factor CFBS for calculating the frequency of the output of the downstream $O_2$ sensor is counted up, and the routine proceeds to step 1300. On the other hand, when $VOS_{i-1}>V_{R2}$, the routine proceeds to step 1300.

At step 1300, $VOS_{i-1}$ is renewed by $VOS_i$, and the processing cycle is ended.

It is advantageous that, according to the present invention, it is exactly determined if the catalyst has deteriorated, on the basis of the length ratio of the response curves of the outputs of the $O_2$ sensors and the frequency ratio of the outputs of the $O_2$ sensors.

The character of the output of the $O_2$ sensor depends on the condition of the operation of the engine determined by an engine speed, an amount of the intake air fed into the engine, an engine load, a temperature of the water of the engine, an opening degree of the throttle valve, etc. Therefore, according to the second embodiment, it is judged if the deterioration of the catalyst should be determined.

FIGS. 16 to 19 show a flowchart illustrating a determination of deterioration of the catalyst in the second embodiment according to the present invention. Below, steps 1301 to 1304 and steps 1305 to 1321 are not explained since steps 1301 to 1304 correspond to steps 1101 to 1104 of FIG. 10 and steps 1305 to 1321 correspond to steps 1105 to 1121 of FIGS. 11, 12 and 13.

According to the second embodiment, at step 1304, when the second air-fuel ratio control is being carried out (XSFB= 1), the routine proceeds to step 1304a. At step 1304a, it is judged if the condition of the operation of the engine is in the determining condition which allows performance of the determination of deterioration of the catalyst. At step 1304a, when the condition of the operation of the engine is in the determining condition, the routine proceeds to step 1305 in FIG. 17. On the other hand, at step 1304a, when the condition of the operation of the engine is not in the determining condition, the processing cycle is ended.

Therefore, according to the second embodiment, the accuracy of the determination of the deterioration of the catalyst is increased since the determination of the deterioration is carried out when the condition of the operation of the engine is in the condition that the feedback control of the air-fuel ratio is effective.

Note that, in the second embodiment, the routines other than the routine for determining deterioration of the catalyst are the same as these in the first embodiment.

As mentioned above, the character of the output of the $O_2$ sensor depends on the condition of the operation of the engine determined by an engine speed, an amount of an intake air fed into the engine, an engine load, a temperature of the water of the engine, an opening degree of the throttle valve, etc. However, the character of the frequency of the output of the $O_2$ sensor does not always change when the character of the length of the response curve of the output of the $O_2$ sensor changes. Further, the length character does not always change when the frequency character changes. Therefore, according to the third embodiment, it is judged if the deterioration of the catalyst should be determined by the length ratio, or the frequency ratio.

Figure 20:
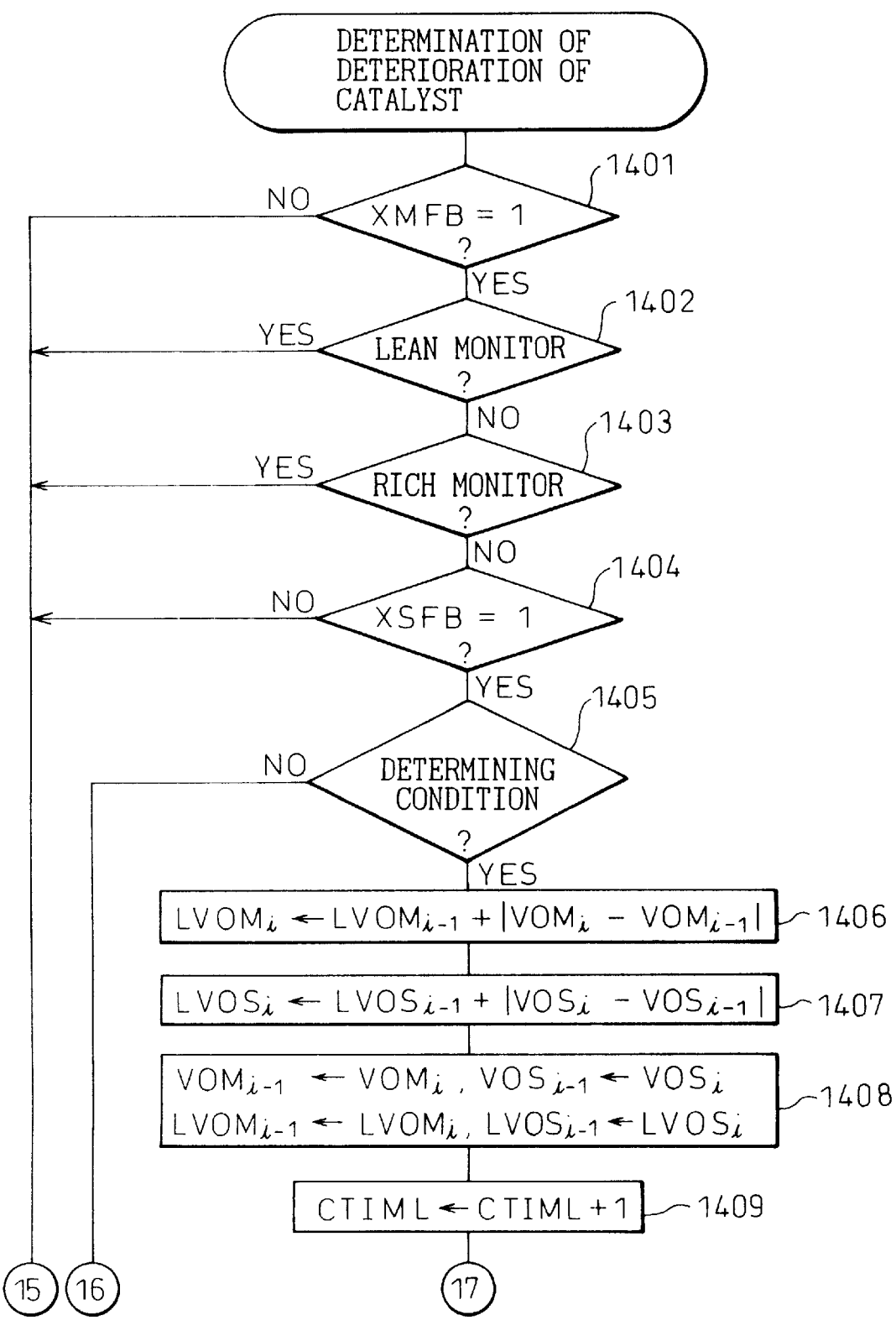
FIGS. 20 to 22 are a flowchart illustrating a determination of deterioration of the catalyst in the third embodiment according to the present invention.
Figure 21:
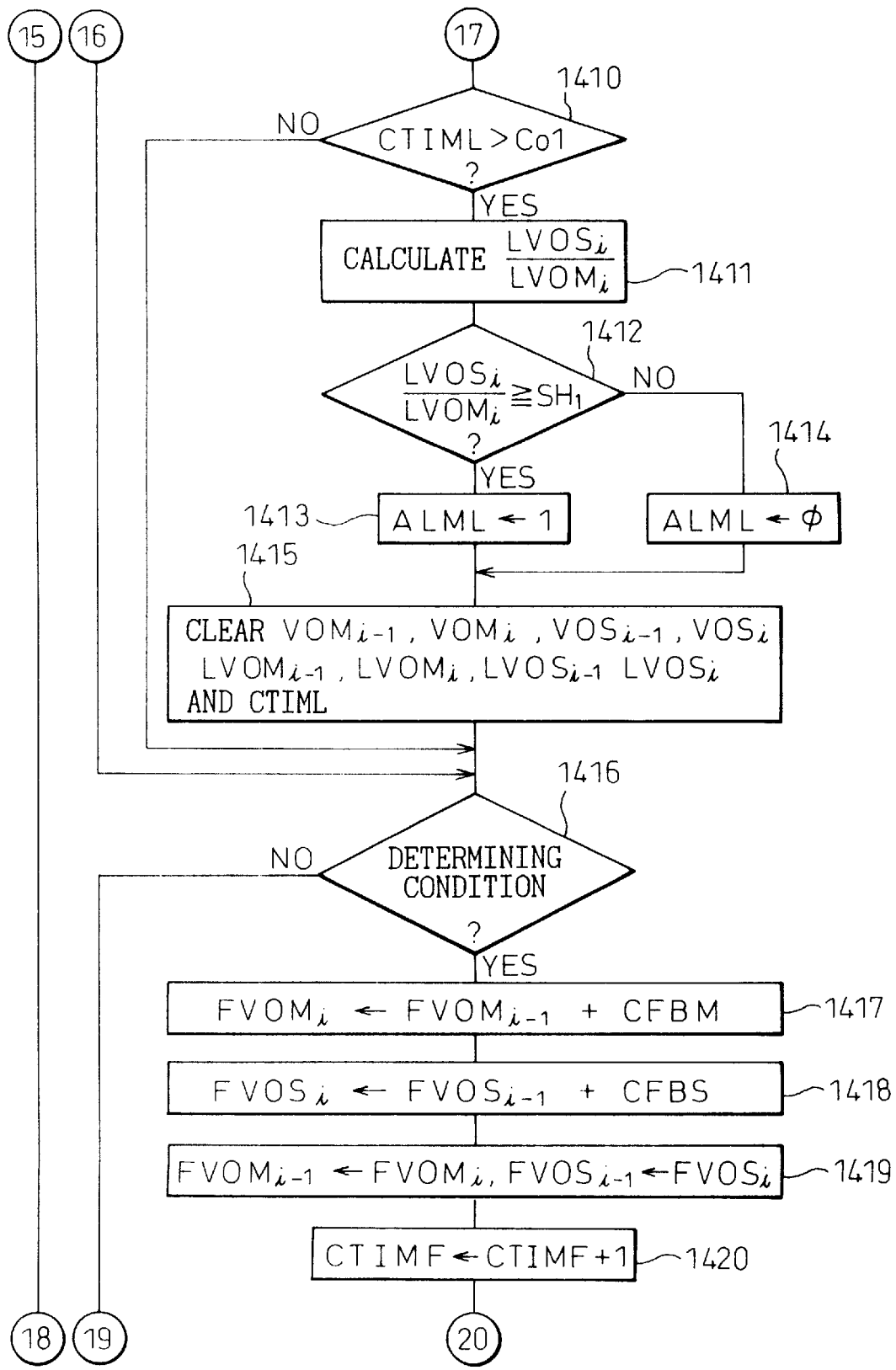

FIGS. 20 and 21 show a flowchart illustrating the routine for determining the deterioration of the catalyst in the third embodiment according to the present invention. Below, steps 1401 to 1404 are not explained since steps 1401 to 1404 correspond to steps 1101 to 1104 of FIG. 10.

According to the third embodiment, at step 1404, when the second air-fuel ratio control is being carried out (XSFB= 1), the routine proceeds to step 1405.

At step 1405, it is judged if the condition of the operation of the engine is in the condition which permits to determine the deterioration of the catalyst by the length ratio of the $O_2$ sensors. At step 1405, when the engine condition is in the condition which permits determination of the deterioration of the catalyst, the routine proceeds to step 1406. On the other hand, at step 1405, when the engine condition is not in the condition which permits determination of the deterioration of the catalyst, the routine proceeds to step 1416 in FIG. 21.

At step 1406, the absolute length $|VOM_i-VOM_{i-1}|$ of the response curve of the output of the upstream $O_2$ sensor between the output voltage $VOM_{i-1}$ of the upstream $O_2$ sensor at the last time routine and the output voltage $VOM_i$ of the upstream $O_2$ sensor at this time routine is added to the length $LVOM_{i-1}$ of the output of the response curve of the upstream $O_2$ sensor which is integrated until the last time routine, and the routine proceeds to step 1407.

At step 1407, the absolute length $|VOS_i-VOS_{i-1}|$ of the response curve of the output of the downstream $O_2$ sensor between the output voltage $VOS_{i-1}$ of the downstream $O_2$ sensor at the last time routine and the output voltage $VOS_i$ of the downstream $O_2$ sensor at this time routine is added to the length $LVOS_{i-1}$ of the output of the response curve of the upstream $O_2$ sensor which is integrated until the last time routine, and the routine proceeds to step 1408.

At step 1408, $VOM_{i-1}$ is renewed by $VOM_i$, $VOS_{i-1}$ is renewed by $VOS_i$, $LVOM_{i-1}$ is renewed by $LVOM_i$, $LVOS_{i-1}$ is renewed by $LVOS_i$, and the routine proceeds to step 1409.

At step 1409, the counter CTIML is counted up, and the routine proceeds to step 1410 in FIG. 21.

At step 1410 in FIG. 21, it is judged if the counter CTIML is greater than the first predetermined value $C_o1$ (CTIML>$C_o1$). At step 1410, when CTIML>$C_o1$, the routine proceeds to step 1411, where the length ratio $VOS_i$, $LVOM_i$ and the routine proceeds to step 1412. On the other hand, at step 1410, when CTIML≦$C_o1$, the routine proceeds to step 1416.

At step 1412, it is judged if the length ratio $LVOS_i/LVOM_i$ is greater than or equal to the first predetermined ratio $SH_1$ ($LVOS_i/LVOM_i$≧$SH_1$). At step 1412, when $LVOS_i/LVOM_i$≧$SH_1$, the routine proceeds to step 1413, where the alarm flag ALML is set (ALML is set to "1"), the routine proceeds to step 1415. On the other hand, at step 1412, when $LVOS_i/LVOM_i$ <$SH_1$, the routine proceeds to step 1414, where the alarm flag AIML is reset (ALML is set to "0"), the routine proceeds to step 1415.

At step 1419, $VOM_{i-1}$, $VOM_i$, $VOS_{i-1}$, $VOS_i$, $LVOM_{i-1}$, $LVOM_i$, $LVOS_{i-1}$, $LVOS_i$, and CTIML are cleared, and the routine proceeds to step 1416.

At step 1416, it is judged if the condition of the operation of the engine is in the determining condition which permits determination of the deterioration of the catalyst by the frequency ratio of the $O_2$ sensors. At step 1416, when the engine condition is in the determining condition, the routine proceeds to step 1417. On the other hand, at step 1416, when the engine condition is not in the determining condition, the routine proceeds to step 1427 in FIG. 22.

At step 1417, the frequency CFBM of the output of the upstream $O_2$ sensor between the last time routine and this time routine, which frequency is calculated according to the routine for calculating the frequency of the output of the $O_2$ sensors described later, is added to the frequency $FVOM_{i-1}$ of the output of the upstream $O_2$ sensor which is integrated until the last time routine, and then the routine proceeds to step 1418.

At step 1418, the frequency CFBS of the output of the downstream $O_2$ sensor between the last time routine and this time routine, which frequency is calculated according to the routine for calculating the frequency of the output of the $O_2$ sensors described later, is added to the frequency $FVOS_{i-1}$ of the output of the upstream $O_2$ sensor which is integrated until the last time routine, and then the routine proceeds to step 1419.

At step 1419, $FVOM_{i-1}$ is renewed by $FVOM_i$, and $FVOS_{i-1}$ is renewed by $FVOS_i$, and the routine proceeds to step 1420.

Figure 22:
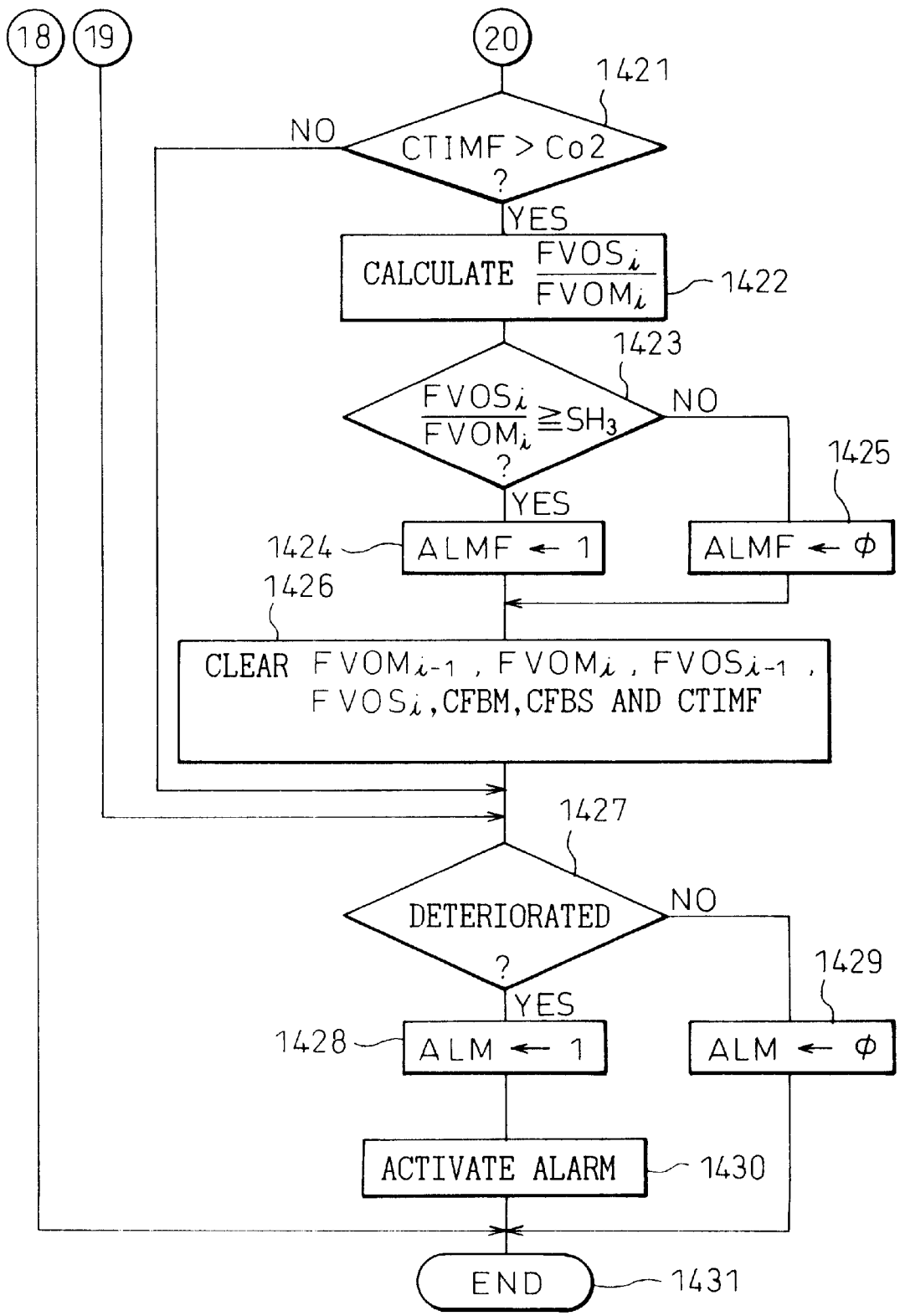

At step 1420, the counter CTIMF is counted up, and the routine proceeds to step 1421 in FIG. 22.

At step 1421, it is judged if the counter CTIMF is greater than the second predetermined value $C_o2$ (CTIMF>$C_o2$). At step 1421, when CTIMF>$C_o2$, the routine proceeds to step 1422, where the frequency ratio $FVOS_i/FVOM_i$ is calculated, and the routine proceeds to step 1423. On the other hand, at step 1421, when CTIMF≦$C_o2$, the routine proceeds to step 1427.

At step 1423, it is judged if the frequency ratio $FVOS_i/FVOM_i$ is greater than or equal to the third predetermined ratio $SH_3$ ($FVOS_i/FVOM_i≧SH_3$). At step 1423, when $FVOS_i/FVOM_i≧SH_3$, the routine proceeds to step 1424, where the alarm flag ALMF is set (ALMF is set to "1"), the routine proceeds to step 1426. On the other hand, at step 1423, when $FVOS_i/FVOM_i<SH_3$, the routine proceeds to step 1425, where the alarm flag ALMF is reset (ALMF is set to "0"), the routine proceeds to step 1415.

At step 1426, $FVOM_{i-1}$, $FVOM_i$, $FVOS_{i-1}$, $FVOS_i$, CFBM, CFBS and CTIMF are cleared, and the routine proceeds to step 1427.

At step 1427, it is judged if the catalyst deteriorates on the basis of the flags ALML and ALMF. At step 1427, when ALML=1 and ALMF=0, the deterioration of the catalyst is determined according to steps corresponding to steps 1112 to 1114 of FIG. 12.

At step 1427, when the catalyst has deteriorated, the routine proceeds to step 1428, where the alarm flag ALM is set (ALM is set to "1"), the routine proceeds to step 1430, where the alarm is activated, and the processing cycle is ended. On the other hand, at step 1427, when the catalyst has not deteriorated, the routine proceeds to step 1429, where the alarm flag ALM is reset (ALM is set to "0"), and the processing cycle is ended.

In the third embodiment, predetermined ratios different from those used at steps 1112, 1113 and 1114 may be used at step 1427. The accuracy of the determination of the deterioration of the catalyst is increased due to using predetermined ratios different from the ratios used at steps 1112, 1113 and 1114.

Note that, in accordance with the combination of the data used to determine the deterioration of the catalyst, steps 1412 to 1414, or steps 1423 to 1425 may be eliminated.

Further note that, at step 1427, when ALML=1 and ALMF=1, the deterioration of the catalyst may be determined.

According to the routine for calculating the frequency in the first embodiment, when the $O_2$ sensor deteriorates, the output voltage of the $O_2$ sensor does not reach the reference voltage even if the catalyst deteriorates. Therefore, according to the routine for calculating the frequency in the second embodiment, the frequency can be calculated even when the $O_2$ sensor has deteriorated.

Figure 23:
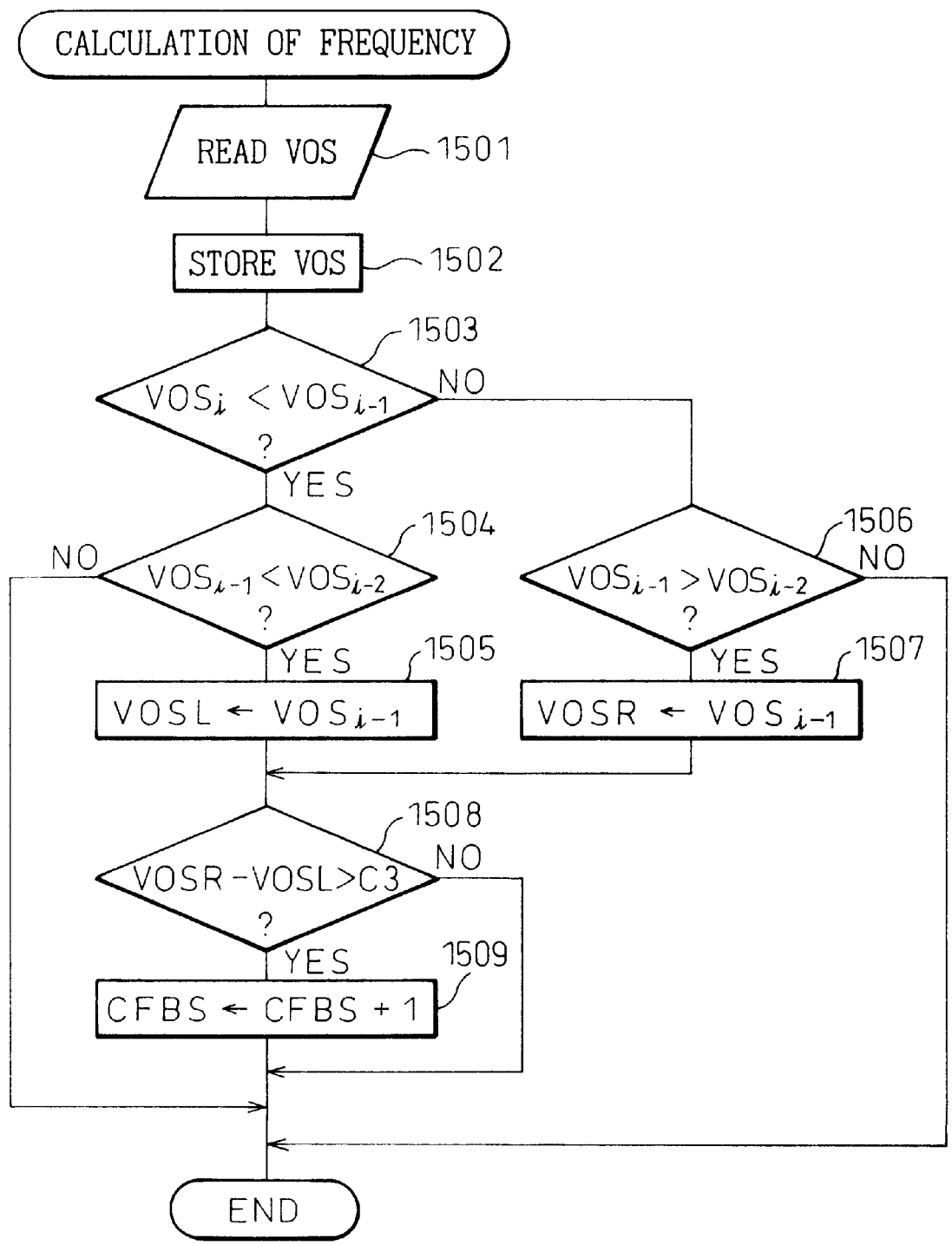
FIG. 23 is a flowchart illustrating a calculation of the frequency of the output of the $O_2$ sensors in the third embodiment according to the present invention.

FIG. 23 shows a flowchart illustrating a calculation of the frequency of the output of the downstream $O_2$ sensor in the third embodiment according to the present invention. At step 1501, the output voltage $VOS_i$ of the downstream $O_2$ sensor at this time routine is read, the routine proceeds to step 1502, where $VOS_i$, is stored, and the routine the proceeds to step 1503.

At step 1503, it is judged if the output voltage $VOS_i$ of the downstream $O_2$ sensor at this time routine is smaller than the output voltage $VOS_{i-1}$ of the downstream $O_2$ sensor at the last time routine ($VOS_i<VOS_{i-1}$). At step 1503, when $VOS_i<VOS_{i-1}$, the routine proceeds to step 1504. On the other hand, at step 1504, when $VOS_i≧VOS_{i-1}$, the routine proceeds to step 1506.

At step 1504, it is judged if the output voltage $VOS_{i-1}$ of the downstream $O_2$ sensor at the last time routine is smaller than the output voltage $VOS_{i-2}$ of the downstream $O_2$ sensor at the routine immediately before the last time routine ($VOS_{i-1}<VOS_{i-2}$) in order to judge if the output voltage of the downstream $O_2$ sensor is continuously decreased twice. Due to step 1504, the noise of the downstream $O_2$ sensor is eliminated. At step 1504, when $VOS_{i-1}>VOS_{i-2}$, it is determined that the output voltage of the downstream $O_2$ sensor is in a decreasing state, the routine proceeds to step 1505, where the decreasing representative value VOSL is renewed by $VOS_{i-1}$, and the routine proceeds to step 1508. On the other hand, at step 1504, when $VOS_{i-1}≧VOS_{i-2}$, the processing cycle is ended.

At step 1506, it is judged if $VOS_{i-1}$ is greater than $VOS_{i-2}$ ($VOS_{i-1}>VOS_{i-2}$) in order to judge if the output voltage of the downstream $O_2$ sensor has continuously increased twice. Due to step 1506, the noise of the downstream $O_2$ sensor is eliminated. At step 1506, when $VOS_{i-1}>VOS_{i-2}$, it is determined that the output voltage of the downstream $O_2$ sensor is in an increasing state, the routine proceeds to step 1507, where the increasing representative value VOSR is renewed by $VOS_{i-1}$, and the routine proceeds to step 1508. On the other hand, at step 1506, when $VOS_{i-1}≦VOS_{i-2}$, the processing cycle is ended.

Figure 24:
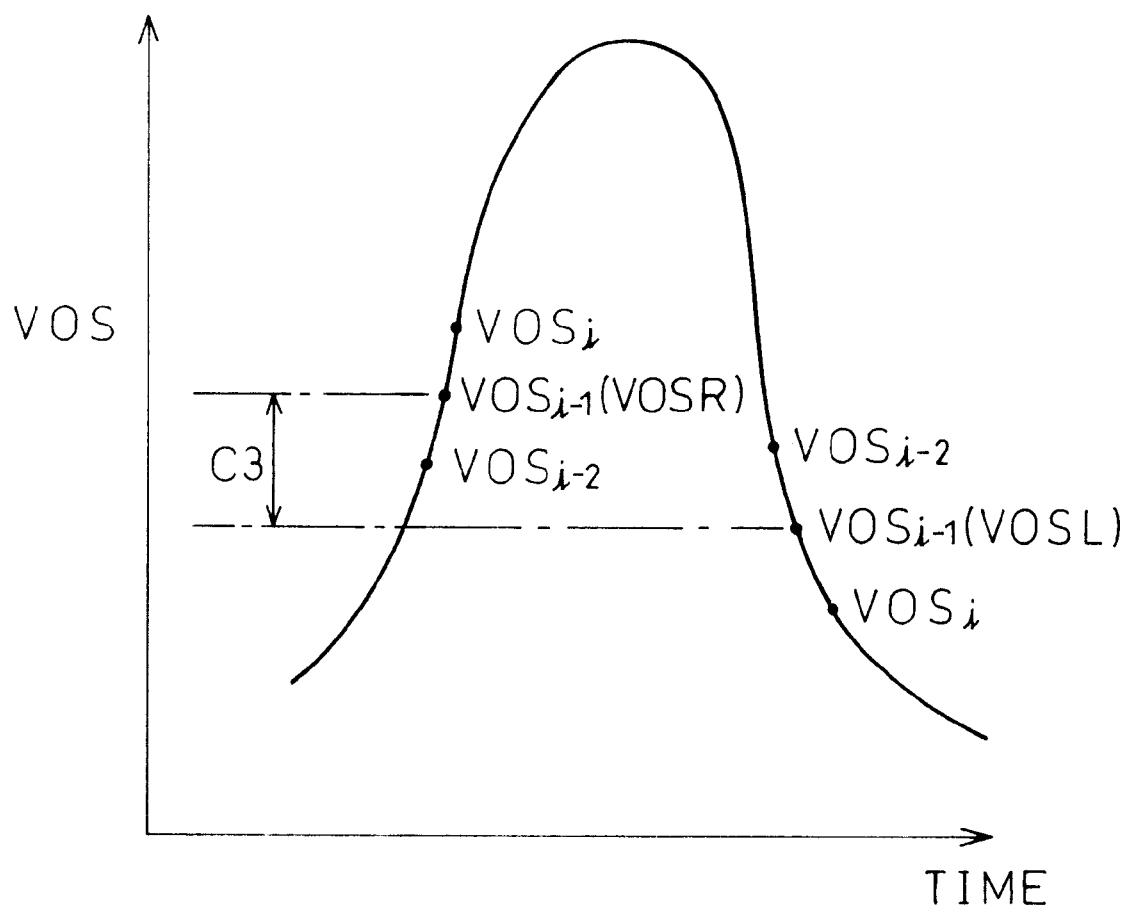
FIG. 24 is a view explaining the calculation of the frequency of the output of the $O_2$ sensors in FIG. 23.

At step 1508, it is judged if the result of the increase representative value VOSL subtracted from the decrease representative value VOSR is greater than a predetermined value C3 (VOSR−VOSL>C3). At step 1508, when VOSR−VOSL>C3, it is determined that the output of the downstream $O_2$ sensor has reversed as shown in FIG. 24, the routine proceeds to step 1509, where the factor CFBS for calculating the frequency of the output of the downstream $O_2$ sensor is counted up, and the processing cycle is ended. On the other hand, at step 1508, when VOSR−VOSL≦C3, it is determined that the output of the downstream $O_2$ sensor has not reversed, and the processing cycle is ended.

Note that the routine for calculating the frequency of the output of the downstream $O_2$ sensor can be applied to calculate the frequency of the output of the upstream $O_2$ sensor. Further, in the third embodiment, the routines other than the routines for determining deterioration of the catalyst and for calculating the frequency of the output of the downstream $O_2$ sensor are the same as those in the first embodiment.

FIG. 25 shows a flowchart illustrating a calculation of frequency of the output of the downstream $O_2$ sensor in the fourth embodiment according to the present invention. Below, steps 1601 to 1607 and step 1609 are not explained since steps 1607 to 1609 and step 1609 correspond to steps 1507 to 1509 and step 1509 of FIG. 23.

At step 1608, it is judged if the result of the increase representative value VOSL subtracted from the decrease representative value VOSR is greater than a predetermined absolute value C4 (|VOSR−VOSL|>C4). At step 1608, when VOSR−VOSL>C4, it is determined that the response curve of the output of the downstream $O_2$ sensor has reversed, i.e., changed from increasing state to decreasing state, the routine proceeds to step 1609, where the factor CFBS for calculating the frequency of the output of the downstream $O_2$ sensor is counted up, and the processing cycle is ended. On the other hand, at step 1608, when VOSR−VOSL≦C4, it is determined that the output of the downstream $O_2$ sensor is not reversed, and the processing cycle is ended.

According to the routine for calculating the frequency of the output of the downstream $O_2$ sensor in the fourth embodiment, the frequency of the output of the downstream $O_2$ sensor is calculated on the basis of a frequency at which a difference between an output voltage of the downstream $O_2$ sensor in the increasing state and an output voltage of the downstream $O_2$ sensor in the increasing state becomes greater than the predetermined absolute voltage.

Note that, the routine for calculating the frequency of the output of the downstream $O_2$ sensor can be applied to calculate the frequency of the output of the upstream $O_2$ sensor. Further, in the fourth embodiment, the routines other than the routine for calculating the frequency of the output of the downstream $O_2$ sensor are the same as those in the first embodiment.

While the invention has been described by reference to specific embodiments chosen for purposes of illustration, it should be apparent that numerous modification can be made thereto by those skilled in the art without departing from the basic concept and scope of the invention.

I claim:

1. A device for determining deterioration of a catalyst having an $O_2$ storage capability, wherein the catalyst is disposed in an exhaust passage of an engine comprising:

an upstream air-fuel ratio sensor disposed in the exhaust passage upstream of the catalyst for detecting an air-fuel ratio of exhaust gas upstream of the catalyst;

a downstream air-fuel ratio sensor disposed in the exhaust passage downstream of the catalyst for detecting an air-fuel ratio of exhaust gas downstream of the catalyst;

air-fuel ratio feedback control means for controlling the air-fuel ratio of the exhaust gas flowing into the catalyst on the basis of the output of the upstream air-fuel ratio sensor to make the air-fuel ratio of the exhaust gas flowing into the catalyst a target air-fuel ratio;

length ratio calculating means for calculating a ratio of a length of a response curve of an output of the downstream air-fuel ratio sensor to a length of a response curve of the output of the upstream air-fuel ratio sensor;

frequency ratio calculating means for calculating a ratio of a frequency of the output of the downstream air-fuel ratio sensor to a frequency of the output of the upstream air-fuel ratio sensor; and determining means for determining that the catalyst has deteriorated when the length ratio is greater than a first predetermined ratio, the determining means also determining that the catalyst has deteriorated when the length ratio is greater than a second predetermined ratio and the frequency ratio is greater than a third predetermined ratio, wherein the second predetermined ratio is smaller than the first predetermined ratio.

2. A device according to claim 1, wherein the length of the response curve of the output of each of the first and second air-fuel ratio sensors is calculated on the basis of a difference between a first output signal of the respective one of the first and second air-fuel ratio sensors and a second output signal of the respective one of the first and second air-fuel ratio sensors, wherein the second output signals immediately succeeds the first output signal.

3. A device according to claim 1, wherein the frequency ratio calculating means calculates the frequency ratio on the basis of a first frequency at which the level of the output of the first air-fuel ratio sensor reaches a reference level and a second frequency at which the level of the output of the second air-fuel ratio sensor reaches the reference level.

4. A device according to claim 1, wherein the frequency ratio calculating means calculates the frequency ratio on the basis of a frequency at which a difference between the level of the output in a decreasing state and the level of the output in an increasing state becomes greater than a predetermined level when the level of the output changes between the increasing state and the decreasing state.

5. A device according to claim 1, wherein the catalyst comprises a three way catalyst.

6. A device according to claim 1, wherein at least one of the first and second air-fuel ratio sensors comprises an $O_2$ sensor which generates an output signal corresponding to a density of $O_2$ gas.

7. A device according to claim 1, wherein the determining means operates when a condition of operation of the engine is a predetermined condition.

8. A device according to claim 7, wherein the predetermined condition is determined by one of an engine speed, an amount of an intake air fed into the engine, an engine load, a temperature of the engine, and an opening degree of a throttle valve of the engine.

9. A device according to claim 1, wherein the air-fuel ratio feedback control means controls the air-fuel ratio of the exhaust gas in such a manner that the air-fuel ratio of the exhaust gas flowing into the catalyst alternates between a first air-fuel ratio richer than a stoichiometric air-fuel ratio and a second air-fuel ratio which is leaner than the stoichiometric air-fuel ratio.

* * * * *